(12) United States Patent
Kometani et al.

(10) Patent No.: US 8,877,825 B2
(45) Date of Patent: Nov. 4, 2014

(54) CATALYST COMPOSITION FOR PRODUCTION OF POLYURETHANE RESIN AND METHOD FOR PRODUCING POLYURETHANE RESIN

(75) Inventors: Hiroyuki Kometani, Tokyo (JP); Yutaka Tamano, Shunan (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 12/377,004

(22) PCT Filed: Aug. 10, 2007

(86) PCT No.: PCT/JP2007/065775
§ 371 (c)(1),
(2), (4) Date: Feb. 10, 2009

(87) PCT Pub. No.: WO2008/018601
PCT Pub. Date: Feb. 14, 2008

(65) Prior Publication Data
US 2010/0130629 A1 May 27, 2010

(30) Foreign Application Priority Data
Aug. 11, 2006 (JP) ................. 2006-220376

(51) Int. Cl.
*C08G 18/16* (2006.01)
*C08G 18/18* (2006.01)
*A43B 13/04* (2006.01)
*C08G 18/20* (2006.01)
*C08G 18/48* (2006.01)
*C08G 18/22* (2006.01)
*C08G 18/09* (2006.01)
*C08G 101/00* (2006.01)

(52) U.S. Cl.
CPC ............ *C08G 18/1875* (2013.01); *A43B 13/04* (2013.01); *C08G 18/2063* (2013.01); *C08G 2101/0066* (2013.01); *C08G 18/4816* (2013.01); *C08G 2101/0008* (2013.01); *C08G 18/225* (2013.01); *C08G 2410/00* (2013.01); *C08G 18/2072* (2013.01); *C08G 18/2036* (2013.01); *C08G 2105/02* (2013.01); *C08G 18/1825* (2013.01); *C08G 18/092* (2013.01); *C08G 18/1808* (2013.01); *C08G 2101/0083* (2013.01)
USPC ........... 521/170; 521/172; 521/174; 502/164; 502/167

(58) Field of Classification Search
CPC .................... B01J 31/0239; C08J 2375/04
USPC .......... 521/170, 172, 174, 128; 524/589, 590, 524/591; 502/164, 167
See application file for complete search history.

(56) References Cited

U.S. PATENT DOCUMENTS

| | | | |
|---|---|---|---|
| 3,010,963 A | 11/1961 | Emer | |
| 3,745,133 A * | 7/1973 | Comunale et al. | 521/156 |
| 3,954,684 A * | 5/1976 | Farrissey et al. | 521/128 |
| 4,026,840 A * | 5/1977 | Bechara et al. | 521/118 |
| 4,036,792 A * | 7/1977 | Hopkins, Jr. | 521/128 |
| 4,568,701 A * | 2/1986 | Hopkins, Jr. | 521/112 |
| 4,582,861 A | 4/1986 | Galla et al. | |
| 4,602,080 A * | 7/1986 | Lambert et al. | 528/67 |

(Continued)

FOREIGN PATENT DOCUMENTS

| | | |
|---|---|---|
| EP | 0606066 A2 | 7/1994 |
| JP | 56-98222 | 8/1981 |

(Continued)

OTHER PUBLICATIONS

International Search Report for PCT/JP2007/065775, mailed Nov. 6, 2007.

(Continued)

*Primary Examiner* — Peter F Godenschwager
(74) *Attorney, Agent, or Firm* — Nixon & Vanderhye P.C.

(57) ABSTRACT

To provide a catalyst composition which is a catalyst composition not impairing the physical properties of a polyurethane resin and the storage stability of the starting material blend liquid and which is capable of producing a polyurethane resin excellent in curability and also excellent in moldability by suppressing the initial reactivity, with good productivity.

A catalyst composition for production of a polyurethane resin, which comprises (A) triethylenediamine, and (B) a polyisocyanurating catalyst and/or (C) a highly temperature sensitive catalyst, wherein the polyisocyanurating catalyst (B) is one or more compounds selected from the group consisting of an alkali metal salt of a carboxylic acid, a quaternary ammonium salt compound of the following formula (1):

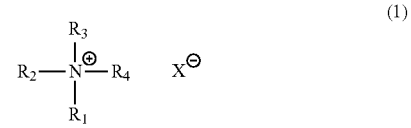

(1)

wherein each of $R_1$ to $R_3$ is a $C_{1-12}$ linear or branched, saturated or unsaturated hydrocarbon group, provided that any two among $R_1$ to $R_3$ may form a hetero ring via an oxygen atom or a nitrogen atom, $R_4$ is a $C_{1-18}$ alkyl group or an aromatic hydrocarbon group, and X is an organic acid group having an acid dissociation constant (pKa) of at most 4.8, N,N,N'-trimethylaminoethylethanolamine and 2,4,6-tris (dimethylaminomethyl)phenol; the highly temperature sensitive catalyst (C) is one or more compounds selected from the group consisting of a triazole salt of 1,8-diazabicyclo [5.4.0]undecene-7, a benzotriazole salt of 1,8-diazabicyclo [5.4.0]undecene-7, a triazole salt of 1,5-diazabicyclo[4.3.0] nonene-5, a benzotriazole salt of 1,5-diazabicyclo[4.3.0] nonene-5, a triazole salt of 1,8-diazabicyclo[5.3.0]decene-7 and a benzotriazole salt of 1,8-diazabicyclo[5.3.0]decene-7; and the blend ratio of the polyisocyanurating catalyst (B) and/or the highly temperature sensitive catalyst (C) to the triethylenediamine (A) is from 2 wt % to 60 wt %.

9 Claims, No Drawings

(56) References Cited

U.S. PATENT DOCUMENTS

| | | |
|---|---|---|
| 4,785,025 A | 11/1988 | Galla et al. |
| 4,902,736 A * | 2/1990 | Nonaka et al. ............... 524/296 |
| 4,904,629 A | 2/1990 | Galla et al. |
| 5,240,970 A | 8/1993 | Nichols et al. |
| 5,288,864 A | 2/1994 | Nichols et al. |
| 5,844,012 A * | 12/1998 | Petrella et al. ............... 521/128 |
| 2002/0022726 A1 | 2/2002 | Ewald et al. |
| 2003/0040549 A1 | 2/2003 | Kim |
| 2003/0144372 A1 | 7/2003 | Kometani et al. |
| 2004/0077740 A1 | 4/2004 | Brecht et al. |
| 2005/0143478 A1* | 6/2005 | Sakai et al. ............... 521/50 |
| 2007/0197760 A1 | 8/2007 | Kometani et al. |

FOREIGN PATENT DOCUMENTS

| | | |
|---|---|---|
| JP | 61-207420 | 9/1986 |
| JP | 62-233102 | 10/1987 |
| JP | 9-124760 | 5/1997 |
| JP | 10-204146 | 8/1998 |
| JP | 2000-95831 | 4/2000 |
| JP | 2001-329036 | 11/2001 |
| JP | 2002-20445 | 1/2002 |
| JP | 2002-296993 | 10/2002 |
| JP | 2004-182927 | 7/2004 |
| JP | 2004-307736 | 11/2004 |
| JP | 2005-120221 | 5/2005 |
| JP | 2005-126695 | 5/2005 |
| JP | 2005-206800 | 8/2005 |
| JP | 2005-325227 | 11/2005 |
| JP | 2005-336495 | 12/2005 |
| JP | 2006-503132 | 1/2006 |
| JP | 2007-77240 | 3/2007 |
| WO | WO 2004/009687 A1 | 1/2004 |

OTHER PUBLICATIONS

English translation of JP Office Action in JP 2008-528908 mailed Mar. 19, 2013.

Official Action and English translation in JP 2008-528908 dispatched Apr. 22, 2014.

* cited by examiner

CATALYST COMPOSITION FOR PRODUCTION OF POLYURETHANE RESIN AND METHOD FOR PRODUCING POLYURETHANE RESIN

This application is the U.S. national phase of International Application No. PCT/Jp2007/065775, filed 10 Aug. 2007, which designated the U.S. and claims priority to Japan Application No. 2006-220376, filed 11 Aug. 2006, the entire contents of each of which are hereby incorporated by reference.

TECHNICAL FIELD

The present invention relates to catalyst composition for production of a polyurethane resin and a method for producing a polyurethane resin employing it.

BACKGROUND ART

A polyurethane resin is produced usually by injecting into a mold and reacting a polyol and a polyisocyanate in the presence of a catalyst and, if necessary, various additives such as a chain extender. The polyurethane resin is widely used as a flexible foam for e.g. seat cushions for automobiles, mattresses, furnitures, etc., a semirigid foam for e.g. instrument panels for automobiles, headrests, armrests, etc, or a rigid foam to be used for e.g. electrical refrigerators, building materials, automobile interior materials, etc. Further, as compared with rubber shoe soles or ethylene/vinyl acetate copolymer (EVA) shoe soles, the polyurethane resin is excellent in abrasion resistance and has a merit such that feet are less likely to get stiff during walking, and its production process involves a less load as compared with shoe soles made of other materials, and therefore, it is widely used for shoe soles.

In recent years, in the production of a polyurethane resin for shoe soles, an excellent curing rate to improve the productivity and excellent moldability to improve the yield have been strongly demanded with a view to saving energy or reducing costs. Further, in order to let the material liquid reach every corner efficiently at the time of injecting the material liquid into a mold, the polyurethane resin is required to have an excellent flowability, and in order to secure the lidding time of the mold as long as possible, it is required to suppress the initial reactivity. However, even if the initial reactivity is suppressed, it is required to facilitate the curing more than ever in order to improve the productivity.

The reaction for forming a polyurethane resin comprises mainly a urethane group-forming reaction (gelling reaction) by a reaction of a polyol with an isocyanate and/or an isocyanate prepolymer, and a urea group-forming reaction (blowing reaction) by a reaction of an isocyanate and/or an isocyanate prepolymer with water. The reaction for forming a polyurethane resin for shoe soles includes, in addition to the above two types of reaction, a crosslinking reaction by a reaction of a crosslinking agent with the urethane group or a reaction of a crosslinking agent with the urea group. The catalyst gives substantial influences not only on these reaction rates but also on the curing rate, flowability, moldability, dimensional stability and physical properties of the polyurethane resin, etc.

As the catalyst for production of a polyurethane resin for shoe soles, a catalyst to accelerate particularly the reaction (gelling reaction) of a polyisocyanate with a polyol and/or the reaction (blowing reaction) of a polyisocyanate with water, has been preferred, and it is widely known that a tertiary amine catalyst becomes an excellent catalyst for production of a polyurethane resin (e.g. Patent Document 1). However, in a case where such a tertiary amine compound is utilized in the production of a polyurethane resin for shoe soles, it has been difficult to shorten the curing time while delaying the time to initiate the reaction, and a solution to this problem has been desired.

For example, a catalyst having a part of the tertiary amine protected by formic acid, or a catalyst for production of a polyurethane composed of a specific saturated dicarboxylic acid and the tertiary amine has been proposed (e.g. Patent Document 2). However, if the initiation time is delayed, the curing time will also be delayed, and the above problem has not thereby been solved.

Further, many cases have been disclosed wherein a quaternary ammonium salt type catalyst is utilized as a catalyst for production of an urethane shoe sole resin, for example, Patent Document 3 discloses use of an N,N'-bis(hydroxyalkyl) quaternary ammonium salt of triethylenediamine, and Patent Document 4 discloses use of triethylenediamine, a quaternary hydroxyalkyl base of imidazole, and their salts. However, if it is attempted to secure the delayed action in curing by using these quaternary ammonium salt-type catalysts for the production of polyurethane resins, there have been problems such that the curing property of the obtainable polyurethane resin tends to be poor, and the final curing tends to decrease or be deteriorated, and therefore a solution of such problems has been desired.

Further, a metal salt, a particularly an alkali metal carboxylate, is well known as a catalyst to accelerate particularly a polyisocyanurating reaction (trimerization of a polyisocyanate). However, when it is used for formation of a polyurethane resin for shoe soles, it has been difficult to control the reaction rate, and the strength of the obtainable polyurethane resin has been inadequate, whereby it has been difficult to obtain a shoe sole product having good moldability.

An organic tin-type catalyst, e.g. dibutyltin dilaurate, is frequently used in a method of employing a polyether polyol developed for the purpose of improving the hydrolyzability of an urethane shoe sole resin, for the reason that the curing property is thereby improved. However, due to a toxicity problem of organic tin, a demand for a substitute catalyst has been increasing.

Further, it is also known to use 1,8-diazabicyclo[5.4.0]undecene-7 as a highly temperature sensitive catalyst for forming a polyurethane resin, but like the alkali metal carboxylate, it has been difficult to control the reaction rate and the strength of the obtainable polyurethane resin is inadequate, whereby it has been difficult to obtain a shoe sole product having good moldability. Further, 1,8-diazabicyclo[5.4.0]undecene-7 is susceptible to hydrolysis, and it is necessary to suppress hydrolysis by using a blocking agent such as phenol, but use of phenol is restricted because of its high toxicity, and a voice to demand a substitute catalyst has been strong.

Further, a catalyst for production of a polyurethane which comprises triethylenediamine and at least one selected from the group consisting of 1,8-diazabicyclo[5.4.0]undecene-7,1,5-diazabicyclo[4.3.0]nonene-5 and their salts, has been proposed (e.g. Patent Document 5). According to Patent Document 5, with a catalyst comprising triethylenediamine and 1,8-diazabicyclo[5.4.0]undecene-7, it is possible to overcome a drawback that the transparency of the obtained shoe sole deteriorates as the time passes, but the above-mentioned problems have not yet thereby been solved.

Patent Document 1: JP-A-62-233102
Patent Document 2: JP-A-2000-95831
Patent Document 3: JP-A-61-207420

Patent Document 4: U.S. Pat. No. 3,010,963
Patent Document 5: JP-A-2005-206800

DISCLOSURE OF THE INVENTION

Object to be Accomplished by the Invention

The present invention has been made in view of the above-mentioned prior art, and its object is to present a catalyst composition which will not impair the physical properties of a polyurethane resin or the storage stability of the raw material blend liquid and which is excellent in the moldability by suppressing the initial reactivity and at the same time capable of producing a polyurethane resin excellent in curability with good productivity, which are desired especially in the production of a polyurethane resin for shoe soles, and a method for producing a polyurethane resin, employing it.

Means to Accomplish the Object

The present inventors have conducted an extensive study to accomplish the above object and as a result, have found that by using a catalyst composition for production of a polyurethane resin, which comprises at least triethylenediamine, and a polyisocyanurate catalyst having a specific structure and/or a highly temperature sensitive amine compound having a specific structure, it is possible to mold a polyurethane resin with good curability while suppressing the initial reactivity, it is possible to produce a polyurethane resin excellent in moldability and flowability with good productivity, and the polyurethane resin thereby obtainable is suitable for application to shoe soles. The present invention has been accomplished on the basis of such discovery.

Namely, the present invention provides the following.

[1] A catalyst composition for production of a polyurethane resin, which comprises (A) triethylenediamine, and (B) a polyisocyanurating catalyst and/or (C) a highly temperature sensitive catalyst, wherein:

the polyisocyanurating catalyst (B) is one or more compounds selected from the group consisting of an alkali metal salt of a carboxylic acid, a quaternary ammonium salt compound of the following formula (1):

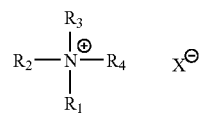

(1)

wherein each of $R_1$ to $R_3$ is a $C_{1-12}$ linear or branched, saturated or unsaturated hydrocarbon group, provided that any two among $R_1$ to $R_3$ may form a hetero ring via an oxygen atom or a nitrogen atom, $R_4$ is a $C_{1-18}$ alkyl group or an aromatic hydrocarbon group, and X is an organic acid group having an acid dissociation constant (pKa) of at most 4.8, N,N,N'-trimethylaminoethylethanolamine and 2,4,6-tris(dimethylaminomethyl)phenol;

the highly temperature sensitive catalyst (C) is one or more compounds selected from the group consisting of a triazole salt of 1,8-diazabicyclo[5.4.0]undecene-7, a benzotriazole salt of 1,8-diazabicyclo[5.4.0]undecene-7, a triazole salt of 1,5-diazabicyclo[4.3.0]nonene-5, a benzotriazole salt of 1,5-diazabicyclo[4.3.0]nonene-5, a triazole salt of 1,8-diazabicyclo[5.3.0]decene-7 and a benzotriazole salt of 1,8-diazabicyclo[5.3.0]decene-7; and the blend ratio of the polyisocyanurating catalyst (B) and/or the highly temperature sensitive catalyst (C) to the triethylenediamine (A) is from 2 wt % to 60 wt %.

[2] The catalyst composition for production of a polyurethane resin according to the above [1], wherein the alkali metal salt of a carboxylic acid is one or more compounds selected from the group consisting of an alkali metal 2-ethylhexanoate, an alkali metal acetate, an alkali metal naphthenate, an alkali metal octanoate, an alkali metal stearate, an alkali metal neodecanoate and an alkali metal oleate.

[3] The catalyst composition for production of a polyurethane resin according to the above [1] or [2], wherein the alkali metal salt of a carboxylic acid is one or more compounds selected from the group consisting of potassium acetate, potassium 2-ethylhexanoate, sodium acetate and sodium 2-ethylhexanoate.

[4] The catalyst composition for production of a polyurethane resin according to any one of the above [1] to [3], wherein in the quaternary ammonium salt compound of the formula (1), X is a formic acid group or an acetic acid group.

[5] The catalyst composition for production of a polyurethane resin according to any one of the above [1] to [4], wherein the quaternary ammonium salt compound of the formula (1) is one or more compounds selected from the group consisting of tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate and trimethyldodecylammonium acetate.

[6] The catalyst composition for production of a polyurethane resin according to any one of the above [1] to [5], which contains one or more solvents selected from the group consisting of water, ethylene glycol, propylene glycol, dipropylene glycol, 1,4-butanediol and 1,6-hexanediol.

[7] The catalyst composition for production of a polyurethane resin according to any one of the above [1] to [6], which contains one or more catalysts selected from the group consisting of N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, bis(2-dimethylaminoethyl)ether bisdimethylaminodiethyl ether and N,N',N''-tris(3-dimethylaminopropyl)-hexahydro-s-triazine.

[8] A method for producing a polyurethane resin, which comprises reacting a polyol with a polyisocyanate and/or an isocyanate prepolymer in the presence of a catalyst and a blowing agent to produce a polyurethane resin, wherein the catalyst composition as defined in any one of the above [1] to [7] is used.

[9] The method for producing a polyurethane resin according to the above [8], wherein the catalyst composition is present in an amount of from 0.01 to 5 parts by weight per 100 parts by weight of the polyol.

[10] A polyurethane resin for shoe soles, obtainable by reacting a polyol with a polyisocyanate and/or an isocyanate prepolymer in the presence of the catalyst composition as defined in any one of the above [1] to [8], and a blowing agent.

Effects of the Invention

By using the catalyst composition of the present invention, it is possible to produce a polyurethane resin excellent in moldability and also excellent in curability, safely and with good productivity by suppressing the initial reactivity without impairing the physical properties of the polyurethane resin and the storage stability of the starting material blend liquid.

Further, the polyurethane resin obtainable by the method of the present invention can be used as a polyurethane resin for shoe soles, which is comparable in physical properties to conventional polyurethane resins for shoe soles.

Further, by using one or more catalysts selected from the group consisting of N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, bis(2-dimethylaminoethyl) ether bisdimethylaminodiethyl ether and N,N',N''-tris(3-dimethylaminopropyl)-hexahydro-s-triazine, in combination with the catalyst composition of the present invention, it is possible to improve the initial reactivity or to improve the flowability of the polyurethane resin without bringing about a problem such as a decrease in hardness of the obtainable polyurethane resin. Therefore, the method of the present invention is industrially very useful as a method for producing a polyurethane resin for shoe soles.

BEST MODE FOR CARRYING OUT THE INVENTION

Now, the present invention will be described in detail.

The catalyst composition for production of a polyurethane resin, comprises (A) triethylenediamine, and (B) a polyisocyanurating catalyst and/or (C) a highly temperature sensitive catalyst, wherein:

the polyisocyanurating catalyst (B) is one or more compounds selected from the group consisting of an alkali metal salt of a carboxylic acid, a quaternary ammonium salt compound of the following formula (1):

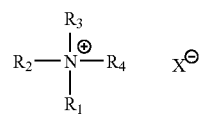

(1)

wherein each of $R_1$ to $R_3$ is a $C_{1-12}$ linear or branched, saturated or unsaturated hydrocarbon group, provided that any two among $R_1$ to $R_3$ may form a hetero ring via an oxygen atom or a nitrogen atom, $R_4$ is a $C_{1-18}$ alkyl group or an aromatic hydrocarbon group, and X is an organic acid group having an acid dissociation constant (pKa) of at most 4.8, N,N,N'-trimethylaminoethylethanolamine and 2,4,6-tris(dimethylaminomethyl)phenol;

the highly temperature sensitive catalyst (C) is one or more compounds selected from the group consisting of a triazole salt of 1,8-diazabicyclo[5.4.0]undecene-7, a benzotriazole salt of 1,8-diazabicyclo[5.4.0]undecene-7, a triazole salt of 1,5-diazabicyclo[4.3.0]nonene-5, a benzotriazole salt of 1,5-diazabicyclo[4.3.0]nonene-5, a triazole salt of 1,8-diazabicyclo[5.3.0]decene-7 and a benzotriazole salt of 1,8-diazabicyclo[5.3.0]decene-7; and the blend ratio of the polyisocyanurating catalyst (B) and/or the highly temperature sensitive catalyst (C) to the triethylenediamine (A) is from 2 wt % to 60 wt %.

In the present invention, the alkali metal salt of a carboxylic acid to be used as the polyisocyanurating catalyst (B) is not particularly limited. However, specifically, it may, for example, be lithium 2-ethylhexanoate, sodium 2-ethylhexanoate, potassium 2-ethylhexanoate, lithium acetate, sodium acetate, potassium acetate, lithium naphthenate, sodium naphthenate, potassium naphthenate, lithium octanoate, sodium octanoate, potassium octanoate, lithium stearate, sodium stearate, potassium stearate, lithium neodecanoate, sodium neodecanoate, potassium neodecanoate, lithium oleate, sodium oleate or potassium oleate. Among these alkali metal salts of carboxylic acids, sodium 2-ethylhexanoate, potassium 2-ethylhexanoate, sodium acetate or potassium acetate is particularly preferred since it has a high catalytic activity and can be industrially advantageously be used.

The alkali metal salt of a carboxylic acid to be used as the polyisocyanurating catalyst (B) in the catalyst composition of the present invention, can easily be produced by methods known in literatures. For example, it is possible to obtain potassium 2-ethylhexanoate by adding 2-ethylhexanoic acid in an aqueous solution of potassium hydroxide to carry out ion exchange.

In the present invention, the quaternary ammonium salt compound of the above formula (1) is not particularly limited. However, specifically, the quaternary ammonium group may, for example, be tetramethylammonium, methyltriethylammonium, ethyltrimethylammonium, butyltrimethylammonium, hexyltrimethylammonium, octyltrimethylammonium, decyltrimethylammonium, dodecyltrimethylammonium, tetradecyltrimethylammonium, hexadecyltrimethylammonium, octadecyltrimethylammonium, tetraethylammonium, methyltriethylammonium, butyltriethylammonium, hexyltriethylammonium, octyltriethylammonium, decyltriethylammonium, dodecyltriethylammonium, tetradecyltriethylammonium, hexadecyltriethylammonium, octadecyltriethylammonium, tetrapropylammonium, methyltripropylammonium, ethyltripropylammonium, butyltripropylammonium, hexyltripropylammonium, octyltripropylammonium, decyltripropylammonium, dodecyltripropylammonium, tetradecylpropylammonium, hexadecyltripropylammonium, octadecyltripropylammonium, tetrabutylammonium, methyltributylammonium, ethyltributylammonium, hexyltributylammonium, octyltributylammonium, decyltributylammonium, dodecyltributylammonium, tetradecyltributylammonium, hexadecyltributylammonium, octadecyltributylammonium or 1,1-dimethyl-4-methylpiperidinium. Among these quaternary ammonium groups, tetramethylammonium, tetraethylammonium or methyltriethylammonium is particularly preferred, since it has high catalytic activity and can industrially advantageously be used.

In the present invention, as the quaternary ammonium compound of the above formula (1), it is important that X is an organic acid having an acid dissociation constant (pKa) of at most 4.8. The organic acid having an acid dissociation constant (pKa) of at most 4.8 is not particularly limited, and it may, for example, be an acid having an acidic OH group such as an aliphatic saturated monocarboxylic acid, an aliphatic unsaturated monocarboxylic acid or an aliphatic polycarboxylic acid, or an organic acid such as an aromatic carboxylic acid. Specifically, it may, for example, be isovaleric acid, formic acid, glycolic acid, acetic acid, chloroacetic acid, cyanoacetic acid, dichloroacetic acid, trichloroacetic acid, trimethylacetic acid, fluoroacetic acid, bromoacetic acid, methoxyacetic acid, mercaptoacetic acid, iodoacetic acid, lactic acid, pyruvic acid, 2-chloropropionic acid, 3-chloropropionic acid, levulinic acid, acrylic acid, crotonic acid, vinylacetic acid, methacrylic acid, adipic acid, azelaic acid, oxaloacetic acid, citric acid, glutaric acid, succinic acid, oxalic acid, d-tartaric acid, tartaric acid (meso), suberic acid, sebacic acid, fumaric acid, maleic acid, malonic acid, ascorbic acid, reductinic acid, reductone, o-anicic acid, m-anicic acid, p-anicic acid, benzoic acid, cinnamic acid, naphthoic acid, phenylacetic acid, phenoxyacetic acid, phthalic acid, isophthalic acid, terephthalic acid or mandelic acid. Among them, preferred is formic acid or acetic acid.

If an organic acid having an acid dissociation constant (pKa) of larger than 4.8 is used for X in the quaternary ammonium salt compound of the above formula (1), a polyester polyol contained in the raw material blend liquid is likely to undergo hydrolysis, whereby the storage stability tends to deteriorate, and it becomes impossible to produce a good polyurethane resin product for shoe soles.

Specifically, the quaternary ammonium salt compound of the above formula (1) may, for example, be tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate or trimethyldodecylammonium acetate. In the present invention, one or more of them may be employed.

In the catalyst composition of the present invention, the above quaternary ammonium salt compound to be used as the polyisocyanurating catalyst (B) can easily be produced by methods known in literatures. For example, a corresponding tertiary amine and a carbonic acid diester are reacted to obtain a quaternary ammonium carbonate, which is subjected to anion exchange reaction with an organic acid, whereupon carbon dioxide gas and an alcohol produced as by-products, are removed to obtain a quaternary ammonium organic acid salt. The production conditions may be from 1 to 20 hours in an autoclave at a temperature of from 50 to 150° C., and in order to quickly complete the reaction with good yield, it is preferred to use a solvent for the reaction. The solvent for the reaction is not particularly limited, but methanol or ethanol is, for example, preferred. The amount of the solvent is not particularly limited.

The highly temperature sensitive catalyst (C) to be used for the catalyst composition of the present invention is not particularly limited so long as it is a catalyst, of which the activity is small at the initial stage in the foaming reaction of the polyurethane resin and the activity becomes very large as the temperature rises along with the progress of the reaction. For example, a triazole salt of 1,8-diazabicyclo[5.4.0]undecene-7, a benzotriazole salt of 1,8-diazabicyclo[5.4.0]undecene-7, a triazole salt of 1,5-diazabicyclo[4.3.0]nonene-5, a benzotriazole salt of 1,5-diazabicyclo[4.3.0]nonene-5, a triazole salt of 1,8-diazabicyclo[5.3.0]decene-7 and a benzotriazole salt of 1,8-diazabicyclo[5.3.0]decene-7 may be mentioned as preferred ones. In the present invention, one or more of them may be used. Among them, a triazole salt of 1,8-diazabicyclo[5.4.0]undecene-7, a benzotriazole salt of 1,8-diazabicyclo[5.4.0]undecene-7, a triazole salt of 1,5-diazabicyclo[4.3.0]nonene-5 or a benzotriazole salt of 1,5-diazabicyclo[4.3.0]nonene-5 is preferred since it has a high catalytic activity and can industrially advantageously be used, and particularly preferred is a triazole salt of 1,8-diazabicyclo[5.4.0]undecene-7 or a benzotriazole salt of 1,8-diazabicyclo[5.4.0]undecene-7.

1,8-Diazabicyclo[5.4.0]undecene-7,1,5-diazabicyclo[4.3.0]nonene-5 and 1,8-diazabicyclo[5.3.0]decene-7 are known to be highly temperature sensitive amine catalysts, but it is difficult to use them in the form of tertiary amines as catalysts for production of polyurethane resins, since they are highly hydrolysable, and their storage stability is poor. In order to improve the storage stability, it is known to use such amine catalysts by blocking them with phenol. However, as mentioned above, high toxicity of phenol is worried, and a voice of demanding prohibition of its use is strong.

On the other hand, triazole or benzotriazole to be used for the highly temperature sensitive catalyst (C) in the present invention has low toxicity as is different from phenol, and it is useful also as a blocking agent, whereby it is possible to improve the storage stability of the highly temperature sensitive catalyst (C).

In the present invention, the blend ratio of the polyisocyanurating catalyst (B) and/or the highly temperature sensitive catalyst (C) to the triethylenediamine (A) is very important. The present inventors have already found that such a blend ratio is practically useful within a range of from 2 wt % to 20 wt %, but by a subsequent study, it has been found that such a blend ratio is practically useful within a range of from 2 wt % to 60 wt %. If the blend ratio of the catalyst is less than 2 wt %, it tends to be difficult to suppress the initial reactivity i.e. to obtain a sufficiently long cream time, and particularly, it becomes impossible to improve the moldability or curability in the production of the polyurethane resin for shoe soles. Further, when the blend ratio of the catalyst is adjusted to be at most 60 wt %, the initial reactivity can be suppressed, a sufficiently long cream time can be obtained, the curability will not be deteriorated, and a polyurethane resin can be produced with good productivity. The blend ratio of the polyisocyanurating catalyst (B) and/or the highly temperature sensitive catalyst (C) to the triethylenediamine (A) is more preferably within a range of from 5 to 50 wt %.

In recent years, designs of shoe soles have become complicated, and it is required to mold a portion with a thickness as thin as less than 2 mm to have a large width. Namely, flowability of a polyurethane resin is important for molding the polyurethane resin for shoe soles. However, in a case where triethylenediamine is used as a commonly employed catalyst, the flowability of the polyurethane resin is not good very much, and an improvement of the flowability is desired. Also in the catalyst system of the present invention, in a case where the triethylenediamine (A), and the polyisocyanurating catalyst (B) and/or the highly temperature sensitive catalyst (C) are used in combination, the flowability of the polyurethane resin may sometimes deteriorate, and in such a case, it becomes necessary to improve the flowability.

In the present invention, as a method for improving the flowability, there may, for example, be mentioned a method of adding a catalyst such as N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, bis(2-dimethylaminoethyl)ether bisdimethylaminodiethyl ether or N,N',N''-tris(3-dimethylaminopropyl)-hexahydro-s-triazine, in a small amount to the catalyst composition of the present invention. To the catalyst composition of the present invention, one or more of such catalysts may be added.

The flowability may be improved by adding such a catalyst to the catalyst composition of the present invention. However, at the same time, there is a possibility that a problem may be brought about such that an increase of the initial reactivity is induced, or the hardness of the obtained polyurethane resin decreases. Therefore, the amount of its addition should be carefully determined. Specifically, it is important that the blend ratio of the catalyst to be added to the triethylenediamine (A) is usually within a range of from 0.01 wt % to 15 wt %, preferably within a range of from 0.01 wt % to 6 wt %.

There may be a case where the catalyst composition of the present invention requires to use a solvent. Namely, in the formation of a polyurethane resin for shoe soles, the catalyst is used as preliminarily mixed with materials such as a foam stabilizer, an assisting agent, etc. In such a case, the catalyst is required to be liquid, and if the catalyst is in a solid state, or crystals are partially precipitated, it can not be uniformly mixed in the starting material liquid, clogging is likely to result during the transportation through a machine line, or clogging is likely to result at the machine head portion, thus leading to damage of the machine. In the catalyst composition of the present invention, triethylenediamine is crystalline i.e. solid, and it is necessary to make it in a liquid state by means of a solvent in the production of a polyurethane resin.

The solvent to be used for the catalyst composition of the present invention is not particularly limited. For example, water, ethylene glycol, diethylene glycol, propylene glycol, dipropylene glycol, 1,4-butanediol, 1,6-hexanediol, or a mixture thereof may be mentioned. Among these solvents, particularly preferred is ethylene glycol or 1,4-butanediol.

The amount of the solvent to be used for the catalyst composition of the present invention is not particularly limited, but it is usually preferably at most 5 times by weight relative to the total amount of the catalyst. If it exceeds 5 times by weight, such may adversely affect the physical properties of the foam, and such being undesirable also for an economical reason.

The method for producing a polyurethane resin of the present invention comprises reacting a polyol with a polyisocyanate and/or an isocyanate-modified prepolymer in the presence of the above catalyst composition of the present invention, a blowing agent and, if necessary, other additives.

In the method of the present invention, the amount of the above catalyst composition of the present invention is within a range of usually from 0.01 to 5 parts by weight, preferably from 0.1 to 2 parts by weight, per 100 parts by weight of the polyol to be used. If it is less than 0.01 part by weight, the reactivity of the polyurethane resin tends to be poor, and no adequate curability is likely to be obtainable. On the other hand, if it exceeds 5 parts by weight, the reactivity of the polyurethane resin tends to be extremely fast, and no adequate time for operation or cream time tends to be obtainable, and a problem of deterioration in the flowability and the moldability of the foam is likely to result.

In addition, the catalyst composition to be used in the method for producing a polyurethane of the present invention may be used in combination with another catalyst within a range not to depart from the present invention. As such another catalyst, in addition to the above-mentioned additive catalyst, a known tertiary amine may, for example, be mentioned. The tertiary amine to be used as such another catalyst may be a conventional one and is not particularly limited. However, it may, for example, be a tertiary amine such as N,N,N',N'-tetramethyl-1,6-hexanediamine, N,N,N',N'-tetramethylguanidine, N,N-dimethylethanolamine, N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N,N-dimethylhexadecyldiamine, N,N-diethylethylenediamine, N,N-diethylpropanediamine, 4-amino-1-diethylaminopentane, N,N-diethylhexanediamine, N-(aminoethyl)piperidine, N-(aminoethyl)-N'-methylpiperazine, N-(aminoethyl)morpholine, N-(aminopropyl)piperidine, N-(aminopropyl)-N'-methylpiperazine, N-(aminopropyl)morpholine, N,N-bis(dimethylaminopropyl)ethylenediamine, N,N-bis(dimethylaminopropyl)propanediamine, N,N-bis(diethylaminopropyl)propanediamine, N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N,N-dimethyl-N',N'-bis(hydroxyethyl)hexadecyldiamine, N,N-diethyl-N',N'-bis(hydroxyethyl)ethylenediamine, N,N-diethyl-N',N'-bis(hydroxyethyl)propanediamine, 4-bis(hydroxyethyl)amino-1-diethylaminopentane, N,N-diethyl-N',N'-bis(hydroxyethyl)hexanediamine, N—(N,N-bis(hydroxyethyl)aminoethyl)piperidine, N—(N,N-bis(hydroxyethyl)aminoethyl)-N'-methylpiperazine, N—(N,N-bis(hydroxyethyl)aminopropyl)piperidine, N—(N,N-bis(hydroxyethyl)aminopropyl)-N'-methylpiperazine, N,N-bis(dimethylaminopropyl)-N',N'-bis(hydroxyethyl)ethylenediamine, N,N-bis(dimethylaminopropyl)-N',N'-bis(hydroxyethyl)propanediamine, N,N-bis(diethylaminopropyl)-N',N'-bis(hydroxyethyl)propanediamine, bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N,N-dimethyl-N',N'-bis(hydroxypropyl)hexadecyldiamine, N,N-diethyl-N',N'-bis(hydroxypropyl)ethylenediamine, N,N-diethyl-N',N'-bis(hydroxypropyl)propanediamine, 4-bis(hydroxypropyl)amino-1-diethylaminopentane, N,N-diethyl-N',N'-bis(hydroxypropyl)hexanediamine, N—(N,N-bis(hydroxypropyl)aminoethyl)piperidine, N—(N,N-bis(hydroxypropyl)aminoethyl)-N'-methylpiperazine, N—(N,N-bis(hydroxypropyl)aminopropyl)piperizine, N—(N,N-bis(hydroxypropyl)aminopropyl)-N'-methylpiperazine, N,N-bis(dimethylaminopropyl)-N',N'-bis(hydroxypropyl)ethylenediamine, N,N-bis(dimethylaminopropyl)-N',N'-bis(hydroxypropyl)propanediamine, N,N-bis(diethylaminopropyl)-N',N'-bis(hydroxypropyl)propanediamine, N,N'-dimethylpiperazine, N-methylmorpholine, N-ethylmorpholine, 1-methylimidazole, 1,2-dimethylimidazole, 1-isobutyl-2-methylimidazole or 1-dimethylaminopropylimidazole. Among them, 1-methylimidazole, 1,2-dimethylimidazole, 1-isobutyl-2-methylimidazole or 1-dimethylaminopropylimidazole is particularly preferred, since it improves the curability of a polyurethane resin for shoe soles employing a polyether polyol.

In the method of the present invention, the polyol to be used may, for example, be a conventional polyether polyol, polyester polyol or polymer polyol, or a flame retardant polyol such as a phosphorus-containing polyol or a halogen-containing polyol, or a phenol type polyol such as a Mannich base polyol. These polyols may be used alone or in proper combination as a mixture.

The polyether polyols can be produced, for example, by an addition reaction of an alkylene oxide such as ethylene oxide or propylene oxide to a starting material which is a compound having at least two active hydrogen groups, such as a polyhydric alcohol such as ethylene glycol, propylene glycol, glycerol, trimethylolpropane or pentaerythritol, an aliphatic amine such as ethylenediamine, an aromatic amine such as toluenediamine, an alkanolamine such as ethanolamine or diethanolamine, sorbitol or sucrose, for example, by a method disclosed in "Polyurethane Handbook" edited by Gunter Oertel (1985), Hanser Publishers (Germany), p. 42-53.

The polyester polyol may, for example, be one obtainable by a reaction of a dibasic acid such as adipic acid with glycol, DMT residue, a polyester polyol obtained from phthalic anhydride as the starting material, waste material from the production of nylon, TMP, waste material of pentaerythritol, waste material of a phthalic acid-type polyester, or a polyester polyol obtained by treatment of waste articles (e.g. edited by Keiji Iwata, "Polyurethane Resin Handbook" (1st edition in 1987), published by Nikkan Kogyo Shinbunsha, p. 116-p. 117).

The polymer polyol may, for example, be a polymer polyol obtained by reacting the above polyether polyol with an ethylenically unsaturated monomer (such as butadiene, acrylonitrile or styrene) in the presence of a radical-polymerization catalyst.

The flame retardant polyol may, for example, be a phosphorus-containing polyol obtained by adding an alkylene oxide to a phosphoric acid compound, a halogen-containing polyol obtained by ring-opening polymerization of epichlorohydrin or trichlorobutylene oxide, or a phenol polyol such as Mannich base polyol.

Among these polyols, a polyester polyol and a polyether polyol are preferably used for the production of a polyurethane resin for shoe soles. As the polyester polyol, one having a molecular weight of from 1,000 to 2,500, obtainable from the reaction of adipic acid with a glycol, is preferred. As the polyether polyol, one having a molecular weight of from 1,000 to 6,000, obtained by reacting propylene oxide to propylene glycol or glycerol as an initiator, followed by reacting ethylene oxide to the terminal, is preferred.

In the method of the present invention, the hydroxyl value of such a polyol is within a range of from 20 to 1,000 mgKOH/g. Specifically, the polyester polyol preferably has a hydroxyl value within a range of from 50 to 1,000 mgKOH/g, and the polyether polyol preferably has a hydroxyl value within a range of from 20 to 800 mgKOH/g.

The isocyanate prepolymer to be used in the method of the present invention is meant for an NCO-terminal intermediate having a polyisocyanate partially modified with a polyol. The polyisocyanate to form the isocyanate prepolymer may be a conventional one and is not particularly limited. For example, it may be an aromatic polyisocyanate such as toluene diisocyanate (TDI), diphenylmethane diisocyanate (MDI), naphthylene diisocyanate or xylylene diisocyanate, an aliphatic polyisocyanate such as hexamethylene diisocyanate, an alicyclic polyisocyanate such as dicyclohexyl diisocyanate or isophorone diisocyanate, or a mixture thereof. Among them, preferred are MDT and TDI, and they may be used as mixed. The polyol to modify the polyisocyanate may be a conventional one and is not particularly limited. However, the same polyol as mentioned above may be used. For example, a conventional polyether polyol, polyester polyol or polymer polyol, or a flame retardant polyol such as a phosphorus-containing polyol or a halogen-containing polyol, or a phenol type polyol such as Mannich base polyol, may be mentioned. These polyols may be used alone or in proper combination as a mixture. Among them, for the isocyanate prepolymer for a polyurethane resin for shoe soles, the above-mentioned polyester polyol and polyether polyol are preferably used.

The polyisocyanate to be used for the method of the present invention may be a conventional one and is not particularly limited. For example, it may be an aromatic polyisocyanate such as toluene diisocyanate (TDI), diphenylmethane diisocyanate (MDI), naphthylene diisocyanate or xylylene diisocyanate, an aliphatic polyisocyanate such as hexamethylene diisocyanate, an alicyclic polyisocyanate such as dicyclohexyl diisocyanate or isophorone diisocyanate, or a mixture thereof. Among them, preferred is MDI, 2,4-TDI or 2,6-TDI, and they may be used as mixed.

The blend ratio of such an isocyanate prepolymer and/or a polyisocyanate to the polyol is not particular limited. However, as represented by an isocyanate index (isocyanate groups/active hydrogen groups reactive with isocyanate groups), it is usually preferably within a range of from 80 to 120, more preferably within a range of from 90 to 110.

The blowing agent to be used in the method of the present invention may be a conventional one and is not particularly limited. For example, it may be a HCFC such as 1,1-dichloro-1-fluoroethane (HCFC-141b), a HFC such as 1,1,1,3,3-pentafluoropropane (HFC-245fa), 1,1,1,3,3-pentafluorobutane (HFC-365mfc), 1,1,2-tetrafluoroethane (HFC-134a) or 1,1,1,2,3,3,3-heptafluoropropane (HFC-227ea), a hydrofluoroether such as HFE-254pc, a law boiling point hydrocarbon or water. These may be used alone or in combination as a mixture.

As the low boiling point hydrocarbon, a hydrocarbon having a boiling point of usually from −30 to 70° C. is usually used. Specific examples thereof include propane, butane, pentane, cyclopentane, hexane and a mixture thereof. In the production of a polyurethane resin for shoe soles, a preferred blowing agent is water.

In the method of the present invention, the amount of the blowing agent to be used is not particularly limited, since it is determined depending upon the desired density or the physical properties of the foam. Specifically, however, it is selected so that the density of the obtainable foam would be usually from 100 to 800 kg/m$^3$, preferably from 200 to 600 kg/m$^3$.

In the present invention, if necessary, a surfactant may be used as a foam stabilizer. The surfactant to be used may, for example, be a conventional organic silicone-type surfactant. Specifically, it may, for example, be a non-ionic surfactant such as an organic siloxane/polyoxyalkylene copolymer or a silicone grease copolymer, or a mixture thereof. The amount thereof is usually within a range of from 0.1 to 10 parts by weight, per 100 parts by weight of the polyol.

In the present invention, if required, a pigment may be used. The pigment is not particularly limited so long as it is one to be used for molding of a polyurethane resin for shoe soles. For example, a double oxide pigment, an inorganic pigment such as chromium yellow, or an organic pigment such as a phthalocyanine pigment or an azo pigment, may be mentioned. The amount of such a pigment is usually within a range of from 0.1 to 20 parts by weight per 100 parts by weight of the polyol.

In the present invention, a crosslinking agent or chain extender may be used as the case requires. Such a crosslinking agent or chain extender may, for example, be a polyhydric alcohol having a low molecular weight such as ethylene glycol, 1,4-butanediol or glycerol, an amine polyol having a low molecular weight such as diethanolamine or triethanolamine, or a polyamine such as ethylenediamine, xylylenediamine or methylenebisorthochloroaniline. Among them, ethylene glycol and 1,4-butanediol are preferably used for the production of a polyurethane resin for shoe soles. The amount of the crosslinking agent or chain extender is usually within a range of from 0.1 to 30 parts by weight per 100 parts by weight of the polyol.

In the method of the present invention, a flame retardant may be used as the case requires. Such a flame retardant may, for example, be a reactive flame retardant like a phosphorus-containing polyol such as propoxylated phosphoric acid or propoxylated dibutylpyrophosphoric acid obtainable by an addition reaction of phosphoric acid with an alkylene oxide, a tertiary phosphate such as tricresyl phosphate, a halogen-containing tertiary phosphate such as tris(2-chloroethyl) phosphate or tris(chloropropyl) phosphate, a halogen-containing organic compound such as dibromopropanol, dibromoneopentyl glycol or tetrabromobisphenol A, or an inorganic compound such as antimony oxide, magnesium carbonate, calcium carbonate or aluminum phosphate. The amount is not particularly limited and may vary depending upon the required flame retardancy, but it is usually within a range of from 4 to 20 parts by weight per 100 parts by weight of the polyol.

Also in the method of the present invention, colorant, an anti-aging agent and other conventional additives may be used as the case requires. The types and amounts of such additives may be within usual ranges of the additives to be used.

The method of the present invention is carried out by vigorously mixing and stirring a blend liquid having the above materials mixed, then injecting it into a proper container or mold, followed by foam molding. The mixing and stirring may be carried out by using a common stirrer or a special machine for production of a polyurethane resin. As the machine for production of a polyurethane resin, a high pressure or low pressure machine can be used.

EXAMPLES

Now, the present invention will be described with reference to Examples and Comparative Examples, but it should be understood that the present invention is by no means restricted to such specific Examples.

In the following Examples and Comparative Examples, the methods for measuring the respective measurement items are as follows.

Measurement Items for Reactivity

Cream time: The time until the reaction for a polyurethane resin has initiated (rise of foam) is measured by visual observation.

Gel time: The time for change from a liquid material to a resin material as the reaction proceeds, is measured.

Tack free time: The time until stickiness of the polyurethane resin surface has disappeared, is measured.

Rise time: The time until the rise of foam has stopped, is measured by visual observation.

Measurement Items for Physical Properties of Polyurethane Resin

Core density of polyurethane resin: The dimension and weight of a polyurethane resin produced by an aluminum mold having an internal dimension of 15×10×1 cm were accurately measured, and the core density was calculated.

Hardness of polyurethane resin: Upon expiration of 2 minutes from the time when a stirred and mixed urethane starting material liquid was injected into an aluminum mold, the mold was removed. The hardness of the resin immediately after removal of the mold (2 minutes later) and upon expiration of 5 days, was measured by a Shore C hardness meter.

Flowability of polyurethane resin: The minimum weight (g) of an urethane starting material liquid when it was filled 100% in an aluminum mold, was measured and used as an index for flowability. The smaller the minimum filled liquid amount, the better the flowability.

Physical properties of polyurethane resin: With respect to a polyurethane resin produced by an aluminum mold, the tensile strength, elongation and modulus (100%, 300%) were measured. For the measurements of the respective physical property items, a Tensilon measuring apparatus was used.

Preparation Example 1

Preparation of Quaternary Ammonium Salt Compound (Catalyst A) (Preparation of a Solution Comprising 50% of Tetraethylammonium Acetate and 50% of Ethylene Glycol)

Into an eggplant-shaped flask, an aqueous tetraethylammonium hydroxide solution (1 mol) was charged, and while it was cooled to maintain room temperature, acetic acid (1 mol) was added to obtain tetraethylammonium acetate. Then, ethylene glycol was added as a solvent so that it became a predetermined concentration, and by means of an evaporator, water was distilled off to obtain a solution comprising 50% of tetraethylammonium acetate and 50% of ethylene glycol.

Preparation Example 2

Preparation of Quaternary Ammonium Salt Compound (Catalyst B) (Preparation of a Solution Comprising 50% of Tetramethylammonium Acetate and 50% of Ethylene Glycol)

A solution comprising 50% of tetramethylammonium acetate and 50% of ethylene glycol, was obtained in the same manner as in Preparation Example 1 except that instead of the aqueous tetraethylammonium hydroxide solution, an aqueous tetramethylammonium hydroxide solution (1 mol) was used.

Preparation Example 3

Preparation of Quaternary Ammonium Salt Compound (Catalyst C) (Preparation of a Solution Comprising 50% of Tetramethylammonium Formate and 50% of Ethylene Glycol)

A solution comprising 50% of tetramethylammonium formate and 50% of ethylene glycol, was obtained in the same manner as in Preparation Example 1 except that instead of acetic acid, formic acid (1 mol) was used.

Preparation Example 4

Preparation of Quaternary Ammonium Salt Compound (Catalyst D) (Preparation of a Solution Comprising 50% of methyltriethylammonium acetate and 50% of ethylene glycol)

Into an autoclave equipped with a stirrer, triethylamine (1 mol), dimethyl carbonate (1.5 mol) and methanol (2 mol) as a solvent, were charged and reacted at a reaction temperature of 110° C. for 12 hours to obtain a methanol solution of methyltriethylammonium carbonate. Acetic acid (1 mol) was charged thereto, and as a solvent, ethylene glycol was added to a predetermined concentration. Then, by means of an evaporator, carbon dioxide formed as a byproduct and methanol were removed to obtain a solution comprising 50% methyltriethylammonium acetate and 50% of ethylene glycol.

Example 1

In accordance with the blend formulation using the polyester polyol as identified in Table 1, a starting material blend liquid A was prepared, and at the same time, an isocyanate prepolymer was prepared.

The weight ratio of the starting material blend liquid A to the isocyanate prepolymer was determined to be a predetermined isocyanate index (100), and the liquid temperature of the starting material blend liquid A was adjusted to be 40° C., and the liquid temperature of the isocyanate prepolymer was adjusted to be 30° C. The predetermined amounts of these two liquids were put into a 200 ml cup and stirred at 3,000 rpm for 8 seconds by means of a laboratory mixer and then poured into a 300 ml cup and reacted to prepare a polyurethane resin for shoe soles.

CT (cream time), TFT (tack free time) and RT (rise time) at that time were measured and taken as the initial reactivity for system storage stability. Then, the starting material scale was increased, and the mixed starting material was put into a mold having the temperature adjusted to 40° C. by a similar operation to carry out molding of a polyurethane resin for shoe soles. After 2 minutes from the time of introducing the mixed liquid, the foam was removed from the mold. Using the molded foam, the hardness was measured, and at the same time, various physical properties were measured.

And, the above starting material blend liquid A was put into a closed container and left to stand at 50° C. for 7 days, and then, it was mixed with the isocyanate prepolymer at a liquid temperature of 40° C. in the same manner to carry out the reaction and molding, whereby RT (rise time) was measured and taken as the reactivity after storage for system storage stability. These results are shown in Table 1.

TABLE 1

| | | | | pKa of quaternary ammonium salt anion (organic acid group) | Example 1 | Example 2 | Example 3 | Example 4 | Comparative Example 1 | Comparative Example 2 | Comparative Example 3 |
|---|---|---|---|---|---|---|---|---|---|---|---|
| Blend formulation (parts by wieght) | Starting material blend liquid A | | Polyol 1) | | 86.8 | 86.8 | 86.8 | 86.8 | 86.8 | 86.8 | 86.8 |
| | | | Cross-linking agent 2) | | 12.2 | 12.2 | 12.2 | 12.2 | 12.2 | 12.2 | 12.2 |
| | | (A) | TEDA-L33E 3) | | 0.86 | 0.86 | 0.86 | 0.86 | 1.00 | 0.95 | 0.95 |
| | | (B) Quaternary ammonium salt compound | Catalyst A 4) | 4.8 | 0.04 | — | — | — | — | — | — |
| | | | Catalyst B 5) | 4.8 | — | 0.04 | — | — | — | — | — |
| | | | Catalyst C 6) | 3.8 | — | — | 0.04 | — | — | — | — |
| | | | Catalyst D 7) | 4.8 | — | — | — | 0.04 | — | — | — |
| | | Tertiary amine compound | Catalyst E 8) | | — | — | — | — | — | 0.05 | — |
| | | | Catalyst F 9) | | — | — | — | — | — | — | 0.05 |
| | | Quaternary ammonium salt compound | Catalyst G 10) | 4.9 | — | — | — | — | — | — | — |
| | | | Catalyst H 11) | 4.9 | — | — | — | — | — | — | — |
| | Isocyanate prepolymer 12) | | | | 100 | 100 | 100 | 100 | 100 | 100 | 100 |
| System storage stability | | | | | | | | | | | |
| Initial reactivity: Rise time (sec) | | | | | 73 | 73 | 74 | 74 | 94 | 88 | 90 |
| Reactivity after storage: Rise time (sec) | | | | | 73 | 73 | 75 | 75 | 94 | 102 | 106 |
| Rise time change (%) | | | | | 0.0 | 0.0 | 1.4 | 1.4 | 0.0 | 15.9 | 17.8 |
| Reactivity | | | | | | | | | | | |
| Cream time (sec) | | | | | 17.5 | 17.5 | 17.5 | 17.5 | 14.5 | 14.5 | 14.5 |
| Tack free time (sec) | | | | | 41 | 40 | 41 | 42 | 43 | 44 | 45 |
| Rise time (sec) | | | | | 73 | 73 | 74 | 74 | 94 | 88 | 90 |
| Physical properties of polyurethane resin | | | | | | | | | | | |
| Core density (kg/m$^3$) | | | | | 500 | 500 | 500 | 500 | 500 | 500 | 500 |
| Hardness (Shore C) | | | | | | | | | | | |
| After 2 min from demold | | | | | 42 | 42 | 41 | 42 | 39 | 39 | 40 |
| After 5 days from demold | | | | | 63 | 63 | 62 | 62 | 63 | 63 | 61 |
| Tensile strength (MPa) | | | | | 1.86 | 1.85 | 1.85 | 1.85 | 1.85 | 1.85 | 1.85 |
| Elongation (%) | | | | | 398 | 397 | 396 | 398 | 402 | 400 | 400 |
| 100% Modulus (MPa) | | | | | 0.62 | 0.63 | 0.63 | 0.62 | 0.62 | 0.61 | 0.62 |
| 300% Modulus (MPa) | | | | | 1.35 | 1.35 | 1.34 | 1.34 | 1.34 | 1.33 | 1.34 |

| | | | | pKa of quaternary ammonium salt anion (organic acid group) | Comparative Example 4 | Comparative Example 5 | Comparative Example 6 | Comparative Example 7 | Comparative Example 8 | Comparative Example 9 |
|---|---|---|---|---|---|---|---|---|---|---|
| Blend formulation (parts by wieght) | Starting material blend liquid A | | Polyol 1) | | 86.8 | 86.8 | 86.8 | 86.8 | 86.8 | 86.8 |
| | | | Cross-linking agent 2) | | 12.2 | 12.2 | 12.2 | 12.2 | 12.2 | 12.2 |
| | | (A) | TEDA-L33E 3) | | — | — | — | — | — | — |
| | | (B) Quaternary | Catalyst A 4) | 4.8 | 1.00 | — | — | — | — | — |

TABLE 1-continued

|  |  |  |  |  |  |  |  |  |  |
|---|---|---|---|---|---|---|---|---|---|
|  | ammonium salt compound | Catalyst B 5) | 4.8 | — | 1.00 | — | — | — | — |
|  |  | Catalyst C 6) | 3.8 | — | — | 1.00 | — | — | — |
|  |  | Catalyst D 7) | 4.8 | — | — | — | 1.00 | — | — |
|  | Tertiary amine compound | Catalyst E 8) |  | — | — | — | — | — | — |
|  |  | Catalyst F 9) |  | — | — | — | — | — | — |
|  | Quaternary ammonium salt compound | Catalyst G 10) | 4.9 | — | — | — | — | 1.00 | — |
|  |  | Catalyst H 11) | 4.9 | — | — | — | — | — | 1.00 |
|  | Isocyanate prepolymer 12) |  |  | 100 | 100 | 100 | 100 | 100 | 100 |

System storage stability

| | | | | | | |
|---|---|---|---|---|---|---|
| Initial reactivity: Rise time (sec) | 102 | 106 | 102 | 109 | 110 | 108 |
| Reactivity after storage: Rise time (sec) | 103 | 106 | 102 | 110 | 135 | 142 |
| Rise time change (%) | 1.0 | 0.0 | 0.0 | 0.9 | 22.7 | 31.5 |

Reactivity

| | | | | | | |
|---|---|---|---|---|---|---|
| Cream time (sec) | 19.0 | 19.5 | 19.5 | 19.0 | 19.0 | 19.0 |
| Tack free time (sec) | 53 | 52 | 51 | 52 | 55 | 53 |
| Rise time (sec) | 102 | 106 | 102 | 109 | 110 | 108 |

Physical properties of polyurethane resin

| | | | | | | |
|---|---|---|---|---|---|---|
| Core density (kg/m$^3$) | 500 | 500 | 500 | 500 | 500 | 500 |

Hardness (Shore C)

| | | | | | | |
|---|---|---|---|---|---|---|
| After 2 min from demold | 30 | 32 | 31 | 30 | 28 | 29 |
| After 5 days from demold | 51 | 51 | 51 | 50 | 48 | 48 |
| Tensile strength (MPa) | 1.65 | 1.63 | 1.62 | 1.60 | 1.60 | 1.61 |
| Elongation (%) | 330 | 330 | 315 | 320 | 310 | 315 |
| 100% Modulus (MPa) | 0.52 | 0.52 | 0.51 | 0.51 | 0.49 | 0.49 |
| 300% Modulus (MPa) | 1.23 | 1.23 | 1.22 | 1.22 | 1.20 | 1.21 |

|  |  |  | pKa of quaternary ammonium salt anion (organic acid group) | Comparative Example ||||||
|---|---|---|---|---|---|---|---|---|---|
|  |  |  |  | 10 | 11 | 12 | 13 | 14 | 15 |
| Blend formulation (parts by wieght) | Starting material blend liquid A |  | Polyol 1) |  | 86.8 | 86.8 | 86.8 | 86.8 | 86.8 | 86.8 |
|  |  |  | Cross-linking agent 2) |  | 12.2 | 12.2 | 12.2 | 12.2 | 12.2 | 12.2 |
|  | (A) |  | TEDA-L33E 3) |  | 0.86 | 0.86 | 0.72 | 0.99 | 0.72 | 0.99 |
|  | (B) Quaternary ammonium salt compound | Catalyst A 4) | 4.8 | — | — | 0.18 | 0.01 | — | — |
|  |  | Catalyst B 5) | 4.8 | — | — | — | — | 0.18 | 0.01 |
|  |  | Catalyst C 6) | 3.8 | — | — | — | — | — | — |
|  |  | Catalyst D 7) | 4.8 | — | — | — | — | — | — |
|  | Tertiary amine compound | Catalyst E 8) |  | — | — | — | — | — | — |
|  |  | Catalyst F 9) |  | — | — | — | — | — | — |
|  | Quaternary ammonium salt compound | Catalyst G 10) | 4.9 | 0.04 | — | — | — | — | — |
|  |  | Catalyst H 11) | 4.9 | — | 0.04 | — | — | — | — |
|  | Isocyanate prepolymer 12) |  |  | 100 | 100 | 100 | 100 | 100 | 100 |

System storage stability

| | | | | | | |
|---|---|---|---|---|---|---|
| Initial reactivity: Rise time (sec) | 92 | 99 | 102 | 88 | 103 | 88 |
| Reactivity after storage: Rise time (sec) | 110 | 121 | 102 | 88 | 104 | 88 |
| Rise time change (%) | 19.6 | 22.2 | 0.0 | 0.0 | 1.0 | 0.0 |

Reactivity

| | | | | | | |
|---|---|---|---|---|---|---|
| Cream time (sec) | 14.5 | 17.5 | 18.0 | 14.5 | 18.0 | 14.5 |
| Tack free time (sec) | 45 | 45 | 51 | 44 | 51 | 44 |
| Rise time (sec) | 92 | 99 | 102 | 88 | 103 | 88 |

Physical properties of polyurethane resin

| | | | | | | |
|---|---|---|---|---|---|---|
| Core density (kg/m$^3$) | 500 | 500 | 500 | 500 | 500 | 500 |

Hardness (Shore C)

| | | | | | | |
|---|---|---|---|---|---|---|
| After 2 min from demold | 38 | 38 | 33 | 39 | 35 | 39 |
| After 5 days from demold | 60 | 60 | 58 | 63 | 60 | 63 |
| Tensile strength (MPa) | 1.83 | 1.82 | 1.80 | 1.85 | 1.82 | 1.85 |
| Elongation (%) | 390 | 390 | 384 | 402 | 390 | 402 |

TABLE 1-continued

| | | | | | | |
|---|---|---|---|---|---|---|
| 100% Modulus (MPa) | 0.61 | 0.60 | 0.56 | 0.62 | 0.58 | 0.62 |
| 300% Modulus (MPa) | 1.33 | 1.32 | 1.30 | 1.34 | 1.28 | 1.34 |

1) Manufactured by Dow: Adipate type polyester polyol (containing 0.4% of water)
2) Manufactured by Dow: Crosslinking agent GF302
3) Manufactured by TOSOH CORPORATION: Triethylenediamine 33%, ethylene glycol 67% (tradename: TEDA-L33E)
4) Tetraethylammonium acetate 50%, ethylene glycol 50% solution (synthesized product)
5) Tetramethylammonium acetate 50%, ethylene glycol 50% solution (synthesized product)
6) Tetramethylammonium formate 50%, ethylene glycol 50% solution (synthesized product)
7) Methyltriethylammonium acetate 50%, ethylene glycol 50% solution (synthesized product)
8) Manufactured by TOSOH CORPORATION: N,N,N',N'-Tetramethylhexamethylenediamine (tradename: TOYOCAT-MR)
9) Manufactured by Nippon Nyukazai Co., Ltd.: 1-Isobutyl-2-methylimidazole
10) Methyltriethylammonium 2-ethylhexanoate (synthesized product)
11) N,N,N-Trimethyl-N-hydroxypropylammonium 2-ethylhexanoate 75%, diethylene glycol 25% (manufactured by Air Products and Chemicals: DABCO-TMR)
12) Manufactured by Dow: MDI base isocyanate prepolymer Examples 2 to 4 and Comparative Examples 1 to 15

In accordance with the blend formulation as identified in Table 1, a starting material blend liquid A was prepared, and at the same time, a polyisocyanate was prepared.

A polyurethane resin for shoe soles was prepared by carrying out the same operation as in Example 1 except for the catalyst blend, and the initial reactivity, resin hardness, resin physical properties and reactivity after storage were measured. These results are also shown in Table 1.

As is evident from Table 1, in Examples 1 to 4 wherein the catalyst composition of the present invention was used, the cream time can be extended at least 2 seconds beyond Comparative Example 1 wherein triethylenediamine as a conventional catalyst was used alone, and at the same time, good curability can be obtained. Further, the physical properties of the obtained polyurethane resin are good, and it is possible to produce a polyurethane resin for shoe soles excellent in moldability and physical properties with good working efficiency. Further, in Examples 1 to 4 wherein the catalyst composition of the present invention was used, the change in RT after storage was small, and the starting material blend liquid after the storage was practically useful level.

Whereas, in Comparative Examples 2 and 3 wherein no catalyst composition of the present invention was used, it was not possible to extend the cream time, and it was not possible to mold the polyurethane resin for shoe soles with good working efficiency.

Further, in Comparative Examples 4 to 7 wherein a quaternary ammonium salt compound as a part of the catalyst composition of the present invention was used alone, although the cream time can be extended, the curability of the obtainable resin is poor, and the resin hardness decreases substantially, whereby a problem such that removal of the mold tends to be difficult, will result, and it becomes difficult to mold the polyurethane resin for shoe soles with good efficiency.

Further, in Comparative Examples 8 to 11 wherein a quaternary ammonium compound outside the present invention was used, it is evident that RT after the storage is consistently slow, and such is not suitable for storage and lacks in practical usefulness. Further, the hardness of the obtainable polyurethane resin is also low, and it is not possible to obtain a polyurethane resin for shoe soles having good physical properties with good productivity.

Further, in Comparative Examples 12 to 15 wherein although a catalyst system of the present invention was employed, the blend ratio of the catalyst in the catalyst system was outside the definition by the present invention, there was a problem such that the curability of the resin was low even if the cream time can be extended, or it is not possible to extend the cream time, and such was not practically useful.

Examples 5 to 10 and Comparative Examples 16 to 30

In accordance with the blend formulation identified in Table 2, a starting material blend liquid A was prepared, and at the same time, a polyisocyanate was prepared.

A polyurethane resin for shoe soles was prepared by carrying out the same operation as in Example 1 except for the catalyst blend, and the initial reactivity, resin hardness, resin physical properties and reactivity after storage were measured. These results are also shown in Table 2.

TABLE 2

| | | | | Example | | | | | | Comparative Example | | |
|---|---|---|---|---|---|---|---|---|---|---|---|---|
| | | | | 5 | 6 | 7 | 8 | 9 | 10 | 1 | 16 | 17 |
| Blend formulation (parts by wieght) | Starting material blend liquid A | | Polyol 1) | 86.8 | 86.8 | 86.8 | 86.8 | 86.8 | 86.8 | 86.8 | 86.8 | 86.8 |
| | | | Cross-linking agent 2) | 12.2 | 12.2 | 12.2 | 12.2 | 12.2 | 12.2 | 12.2 | 12.2 | 12.2 |
| | | (A) | TEDA-L33E 3) | 0.86 | 0.86 | 0.86 | 0.86 | 0.86 | 0.86 | 1.00 | — | — |
| | | (B) Alkali metal salt of carboxylic acid | Catalyst I 4) | 0.04 | — | — | — | — | — | — | 1.00 | — |
| | | | Catalyst J 5) | — | 0.04 | — | — | — | — | — | — | 1.00 |
| | | (B) Polyisocyanulating catalyst | Catalyst N 6) | — | — | — | — | 0.04 | — | — | — | — |
| | | | Catalyst O 7) | — | — | — | — | — | 0.04 | — | — | — |
| | | (C) Highly temperature sensitive catalyst | Catalyst K 8) | — | — | 0.04 | — | — | — | — | — | — |
| | | | Catalyst L 9) | — | — | — | 0.04 | — | — | — | — | — |
| | | | Catalyst M 10) | — | — | — | — | — | — | — | — | — |
| | Isocyanate prepolymer 11) | | | 100 | 100 | 100 | 100 | 100 | 100 | 100 | 100 | 100 |

TABLE 2-continued

| | | | | | | | | | | |
|---|---|---|---|---|---|---|---|---|---|---|
| System storage stability | | | | | | | | | | |
| Initial reactivity: Rise time (sec) | | | | 64 | 69 | 82 | 88 | 85 | 88 | 94 | 109 | 106 |
| Reactivity after storage: Rise time (sec) | | | | 64 | 70 | 82 | 88 | 85 | 88 | 94 | 112 | 115 |
| Rise time change (%) | | | | 0.0 | 1.4 | 0.0 | 0.0 | 0.0 | 0.0 | 0.0 | 2.8 | 8.5 |
| Reactivity | | | | | | | | | | | | |
| Cream time (sec) | | | | 17.5 | 17.5 | 17.0 | 17.0 | 16.5 | 16.5 | 14.5 | 18.5 | 18.5 |
| Tack free time (sec) | | | | 44 | 44 | 40 | 42 | 43 | 44 | 43 | 50 | 53 |
| Rise time (sec) | | | | 64 | 69 | 82 | 88 | 85 | 88 | 94 | 109 | 106 |
| Physical properties of polyurethane resin | | | | | | | | | | | | |
| Core density (kg/m³) | | | | 500 | 500 | 500 | 500 | 500 | 500 | 500 | 500 | 500 |
| Hardness (Shore C) | | | | | | | | | | | | |
| After 2 min from demold | | | | 39 | 39 | 39 | 39 | 39 | 39 | 39 | 30 | 31 |
| After 5 days from demold | | | | 61 | 60 | 64 | 64 | 62 | 62 | 63 | 51 | 51 |
| Tensile strength (MPa) | | | | 1.86 | 1.85 | 1.85 | 1.85 | 1.85 | 1.84 | 1.85 | 1.64 | 1.62 |
| Elongation (%) | | | | 395 | 395 | 390 | 390 | 400 | 395 | 402 | 320 | 301 |
| 100% Modulus (MPa) | | | | 0.62 | 0.63 | 0.63 | 0.62 | 0.62 | 0.62 | 0.62 | 0.52 | 0.50 |
| 300% Modulus (MPa) | | | | 1.35 | 1.35 | 1.34 | 1.34 | 1.34 | 1.34 | 1.34 | 1.12 | 1.10 |

| | | | | Comparative Example | | | | | | |
|---|---|---|---|---|---|---|---|---|---|---|
| | | | | 18 | 19 | 20 | 21 | 22 | 23 | 24 |
| Blend formulation (parts by weight) | Starting material blend liquid A | | Polyol 1) | 86.8 | 86.8 | 86.8 | 86.8 | 86.8 | 86.8 | 86.8 |
| | | | Cross-linking agent 2) | 12.2 | 12.2 | 12.2 | 12.2 | 12.2 | 12.2 | 12.2 |
| | | (A) | TEDA-L33E 3) | — | — | — | 0.72 | 0.99 | 0.72 | 0.09 |
| | | (B) Alkali metal salt of carboxylic acid | Catalyst I 4) | — | — | — | 0.18 | 0.01 | — | — |
| | | | Catalyst J 5) | — | — | — | — | — | 0.18 | 0.01 |
| | | (B) Polyiso-cyanulating catalyst | Catalyst N 6) | — | 1.00 | — | — | — | — | — |
| | | | Catalyst O 7) | — | — | 1.00 | — | — | — | — |
| | | (C) Highly temperature sensitive catalyst | Catalyst K 8) | — | — | — | — | — | — | — |
| | | | Catalyst L 9) | — | — | — | — | — | — | — |
| | | | Catalyst M 10) | 1.00 | — | — | — | — | — | — |
| | Isocyanate prepolymer 11) | | | 100 | 100 | 100 | 100 | 100 | 100 | 100 |
| System storage stability | | | | | | | | | | |
| Initial reactivity: Rise time (sec) | | | | 109 | 109 | 112 | 101 | 93 | 106 | 94 |
| Reactivity after storage: Rise time (sec) | | | | 135 | 109 | 115 | 102 | 94 | 106 | 95 |
| Rise time change (%) | | | | 23.9 | 0.0 | 2.7 | 1.0 | 1.1 | 0.0 | 1.1 |
| Reactivity | | | | | | | | | | |
| Cream time (sec) | | | | 19.0 | 18.0 | 18.0 | 17.5 | 14.5 | 17.5 | 14.5 |
| Tack free time (sec) | | | | 52 | 51 | 53 | 49 | 44 | 50 | 43 |
| Rise time (sec) | | | | 109 | 109 | 112 | 101 | 93 | 106 | 94 |
| Physical properties of polyurethane resin | | | | | | | | | | |
| Core density (kg/m³) | | | | 500 | 500 | 500 | 500 | 500 | 500 | 500 |
| Hardness (Shore C) | | | | | | | | | | |
| After 2 min from demold | | | | 32 | 30 | 28 | 35 | 39 | 34 | 30 |
| After 5 days from demold | | | | 52 | 51 | 52 | 60 | 63 | 59 | 62 |
| Tensile strength (MPa) | | | | 1.58 | 1.57 | 1.55 | 1.80 | 1.85 | 1.83 | 1.84 |
| Elongation (%) | | | | 295 | 320 | 305 | 380 | 400 | 375 | 400 |
| 100% Modulus (MPa) | | | | 0.51 | 0.50 | 0.49 | 0.59 | 0.62 | 0.59 | 0.61 |
| 300% Modulus (MPa) | | | | 1.10 | 1.12 | 1.08 | 1.30 | 1.34 | 1.30 | 1.33 |

| | | | | Comparative Example | | | | | |
|---|---|---|---|---|---|---|---|---|---|
| | | | | 25 | 26 | 27 | 28 | 29 | 30 |
| Blend formulation (parts by weight) | Starting material blend liquid A | | Polyol 1) | 86.8 | 86.8 | 86.8 | 86.8 | 86.8 | 86.8 |
| | | | Cross-linking agent 2) | 12.2 | 12.2 | 12.2 | 12.2 | 12.2 | 12.2 |
| | | (A) | TEDA-L33E 3) | 0.72 | 0.99 | 0.72 | 0.99 | 0.72 | 0.99 |
| | | (B) Alkali metal salt of carboxylic acid | Catalyst I 4) | — | — | — | — | — | — |
| | | | Catalyst J 5) | — | — | — | — | — | — |
| | | (B) Polyiso- | Catalyst N 6) | — | — | — | — | — | — |

TABLE 2-continued

|  |  |  |  |  |  |  |  |  |
|---|---|---|---|---|---|---|---|---|
|  | cyanulating catalyst | Catalyst O 7) | — | — | — | — | 0.18 | 0.01 |
|  | (C) Highly temperature sensitive catalyst | Catalyst K 8) | 0.18 | 0.01 | — | — | — | — |
|  |  | Catalyst L 9) | — | — | 0.18 | 0.01 | — | — |
|  |  | Catalyst M 10) | — | — | — | — | — | — |
| Isocyanate prepolymer 11) |  |  | 100 | 100 | 100 | 100 | 100 | 100 |
| System storage stability |  |  |  |  |  |  |  |  |
| Initial reactivity: Rise time (sec) |  |  | 102 | 94 | 102 | 94 | 103 | 94 |
| Reactivity after storage: Rise time (sec) |  |  | 102 | 95 | 103 | 95 | 104 | 94 |
| Rise time change (%) |  |  | 0.0 | 1.1 | 1.0 | 1.1 | 1.0 | 0.0 |
| Reactivity |  |  |  |  |  |  |  |  |
| Cream time (sec) |  |  | 18.0 | 14.5 | 18.0 | 14.5 | 18.0 | 14.5 |
| Tack free time (sec) |  |  | 52 | 44 | 52 | 44 | 53 | 44 |
| Rise time (sec) |  |  | 102 | 94 | 102 | 94 | 103 | 94 |
| Physical properties of polyurethane resin |  |  |  |  |  |  |  |  |
| Core density (kg/m$^3$) |  |  | 500 | 500 | 500 | 500 | 500 | 500 |
| Hardness (Shore C) |  |  |  |  |  |  |  |  |
| After 2 min from demold |  |  | 32 | 39 | 30 | 39 | 31 | 39 |
| After 5 days from demold |  |  | 57 | 63 | 58 | 63 | 56 | 63 |
| Tensile strength (MPa) |  |  | 1.80 | 1.85 | 1.80 | 1.85 | 1.80 | 1.85 |
| Elongation (%) |  |  | 384 | 397 | 375 | 397 | 380 | 400 |
| 100% Modulus (MPa) |  |  | 0.56 | 0.62 | 0.58 | 0.62 | 0.55 | 0.62 |
| 300% Modulus (MPa) |  |  | 1.29 | 1.34 | 1.26 | 1.34 | 1.28 | 1.34 |

1) Manufactured by Dow: Adipate type polyester polyol (containing 0.4% of water)
2) Manufactured by Dow: Crosslinking agent GF302
3) Manufactured by TOSOH CORPORATION: Triethylenediamine 33%, ethylene glycol 67% (tradename: TEDA-L33)
4) Potassium 2-ethylhexanoate 75%, diethylene glycol 25% (synthesized product)
5) Potassium acetate 38%, diethylene glycol 62% (synthesized product)
6) Manufactured by TOSOH CORPORATION: N,N,N'-Trimethylaminoethylethanolamine (tradename: TOYOCAT-RX5)
7) 2,4,6-Tris(dimethylaminomethyl)phenol (manufactured by Tokyo Kasei)
8) 1,8-Diazabicyclo[5.4.0]undecene-7 (manufactured by Tokyo Kasei) 68.8%, 1,2,4-Triazole (manufactured by Otsuka Kagaku) 31.2%
9) 1,8-Diazabicyclo[5.4.0]undecene-7 (manufactured by Tokyo Kasei) 56.1%, 1,2,3-Benzotriazole (manufactured by Tokyo Kasei) 43.9%
10) 1,8-Diazabicyclo[5.4.0]undecene-7 (manufactured by Tokyo Kasei)
11) Manufactured by Dow: MDI base isocyanate prepolymer As is evident from Table 2, in Examples 5 to 10 wherein the catalyst system of the present invention was used as the catalyst, the cream time can be extended at least 2 seconds longer than in Comparative Example 1 wherein triethylenediamine as a conventional catalyst was used alone, and it is possible to mold a polyurethane resin for shoe soles excellent in moldability. Further, the hardness and physical properties of the obtained polyurethane resin are sufficiently in a preferred range. Further, in Examples 5 to 10 wherein the catalyst system of the present invention was used, the change in RT after the storage was small, and the starting material blend liquid after the storage was practically useful level.

Whereas, in Comparative Examples 16 to 20 wherein an alkali metal salt of carboxylic acid, or N,N,N'-trimethylaminoethylethanolamine, 2,4,6-tris(dimethylaminomethy)phenol or 1,8-diazabicyclo[5.4.0]undecene-7, as a part of the catalyst composition of the present invention, was used alone, although the cream time can be extended, the curability of the obtained resin is poor, and the hardness of the resin decreases substantially, whereby a problem such that removal of a mold tends to be difficult, will result, and it is difficult to mold a polyurethane resin for shoe soles with good efficiency. Further, in Comparative Example 18 wherein 1,8-diazabicyclo[5.4.0]undecene-7 not blocked with a blocking agent, was used, the storage stability of the system was substantially deteriorated, whereby there is a problem of deterioration of the catalyst.

Further, in Comparative Examples 21 to 30 wherein although a catalyst system of the present invention was employed, the blend ratio of catalyst of the catalyst system was outside the definition by the present invention, there is a problem such that although the cream time can be extended, the curability of the polyurethane resin is low, such being practically not useful, or there is a problem such that the cream time can not be extended, and thus it is evident that they are not suitable catalyst systems.

Examples 11 to 14 and Comparative Examples 31 to 38

In accordance with the blend formulation as identified in Table 3, a starting material blend liquid A was prepared, and at the same time, a polyisocyanate was prepared.

A polyurethane resin for shoe soles was prepared by carrying out the same operation as in Example 1 except for the catalyst blend, and the initial reactivity, resin hardness, resin physical properties and reactivity after the storage were measured. These results are also shown in Table 3.

TABLE 3

| | | | pKa of quaternary ammonium salt anion (organic acid group) | Example 11 | Example 12 | Example 13 | Example 14 |
|---|---|---|---|---|---|---|---|
| Blend formulation (parts by weight) | Starting material blend liquid A | Polyol 1) | | 86.8 | 86.8 | 86.8 | 86.8 |
| | | Cross-linking agent 2) | | 12.2 | 12.2 | 12.2 | 12.2 |
| | (A) | TEDA-L33E 3) | | 0.86 | 0.86 | 0.86 | 0.86 |
| | (B) Quaternary ammonium salt compound | Catalyst A 4) | 4.8 | 0.04 | — | — | — |
| | | Catalyst B 5) | 4.8 | — | 0.04 | — | — |
| | | Catalyst C 6) | 3.8 | — | — | 0.04 | — |
| | | Catalyst D 7) | 4.8 | — | — | — | 0.04 |
| | Tertiary amine compound | Catalyst E 8) | | — | — | — | — |
| | | Catalyst F 9) | | — | — | — | — |
| | | TRC 10) | | 0.01 | 0.01 | 50.01 | 0.01 |
| | Isocyanate prepolymer 11) | | | 100 | 100 | 100 | 100 |
| System storage stability | | | | | | | |
| Initial reactivity: Rise time (sec) | | | | 73 | 73 | 74 | 74 |
| Reactivity after storage: Rise time (sec) | | | | 73 | 73 | 75 | 75 |
| Rise time change (%) | | | | 0.0 | 0.0 | 1.4 | 1.4 |
| Reactivity | | | | | | | |
| Cream time (sec) | | | | 17.5 | 17.5 | 17.5 | 17.5 |
| Tack free time (sec) | | | | 41 | 40 | 41 | 42 |
| Rise time (sec) | | | | 73 | 73 | 74 | 74 |
| Physical properties of polyurethane resin | | | | | | | |
| Flowability | | | | 71 | 71 | 72 | 72 |
| Core density (kg/m$^3$) | | | | 500 | 500 | 500 | 500 |
| Hardness (Shore C) | | | | | | | |
| After 2 min from demold | | | | 42 | 42 | 42 | 42 |
| After 5 days from demold | | | | 63 | 63 | 62 | 62 |
| Tensile strength (MPa) | | | | 1.86 | 1.85 | 1.85 | 1.85 |
| Elongation (%) | | | | 395 | 396 | 397 | 398 |
| 100% Modulus (MPa) | | | | 0.62 | 0.63 | 0.63 | 0.62 |
| 300% Modulus (MPa) | | | | 1.35 | 1.35 | 1.34 | 1.34 |

| | | | pKa of quaternary ammonium salt anion (organic acid group) | Comp. Ex. 31 | 32 | 33 | 34 | 35 | 36 | 37 | 38 |
|---|---|---|---|---|---|---|---|---|---|---|---|
| Blend formulation (parts by weight) | Starting material blend liquid A | Polyol 1) | | 86.8 | 86.8 | 86.8 | 86.8 | 86.8 | 86.8 | 86.8 | 86.8 |
| | | Cross-linking agent 2) | | 12.2 | 12.2 | 12.2 | 12.2 | 12.2 | 12.2 | 12.2 | 12.2 |
| | (A) | TEDA-L33E 3) | | 1.00 | 0.95 | 0.95 | — | — | — | — | — |
| | (B) Quaternary ammonium salt compound | Catalyst A 4) | 4.8 | — | — | — | 1.00 | — | — | — | — |
| | | Catalyst B 5) | 4.8 | — | — | — | — | 1.00 | — | — | — |
| | | Catalyst C 6) | 3.8 | — | — | — | — | — | 1.00 | — | — |
| | | Catalyst D 7) | 4.8 | — | — | — | — | — | — | 1.00 | — |
| | Tertiary amine compound | Catalyst E 8) | | — | 0.05 | — | — | — | — | — | — |
| | | Catalyst F 9) | | — | — | 0.05 | — | — | — | — | — |
| | | TRC 10) | | — | — | — | — | — | — | — | 1.00 |
| | Isocyanate prepolymer 11) | | | 100 | 100 | 100 | 100 | 100 | 100 | 100 | 100 |
| System storage stability | | | | | | | | | | | |
| Initial reactivity: Rise time (sec) | | | | 94 | 88 | 90 | 102 | 106 | 102 | 109 | 110 |
| Reactivity after storage: Rise time (sec) | | | | 94 | 102 | 106 | 103 | 106 | 102 | 110 | 112 |
| Rise time change (%) | | | | 0.0 | 15.9 | 17.8 | 1.0 | 0.0 | 0.0 | 0.9 | 1.8 |
| Reactivity | | | | | | | | | | | |
| Cream time (sec) | | | | 14.5 | 14.5 | 14.5 | 19.0 | 19.5 | 19.5 | 19.0 | 19.0 |
| Tack free time (sec) | | | | 43 | 44 | 45 | 53 | 52 | 51 | 52 | 55 |
| Rise time (sec) | | | | 94 | 88 | 90 | 102 | 106 | 102 | 109 | 110 |
| Physical properties of polyurethane resin | | | | | | | | | | | |
| Flowability | | | | 84 | 89 | 90 | 102 | 103 | 101 | 103 | 68 |
| Core density (kg/m$^3$) | | | | 500 | 500 | 500 | 500 | 500 | 500 | 500 | 500 |

TABLE 3-continued

| Hardness (Shore C) | | | | | | | | |
|---|---|---|---|---|---|---|---|---|
| After 2 min from demold | 39 | 39 | 40 | 30 | 32 | 31 | 30 | 24 |
| After 5 days from demold | 63 | 63 | 61 | 51 | 51 | 51 | 50 | 43 |
| Tensile strength (MPa) | 1.85 | 1.85 | 1.85 | 1.65 | 1.63 | 1.62 | 1.60 | 1.25 |
| Elongation (%) | 402 | 400 | 400 | 330 | 330 | 315 | 320 | 290 |
| 100% Modulus (MPa) | 0.62 | 0.61 | 0.62 | 0.52 | 0.52 | 0.51 | 0.51 | 0.48 |
| 300% Modulus (MPa) | 1.34 | 1.33 | 1.34 | 1.23 | 1.23 | 1.22 | 1.22 | 1.12 |

1) Manufactured by Dow: Adipate type polyester polyol (containing 0.4% of water)
2) Manufactured by Dow: Crosslinking agent GF302
3) Manufactured by TOSOH CORPORATION: Triethylenediamine 33%, ethylene glycol 67% (tradename: TEDA-L33E)
4) Tetraethylammonium acetate 50%, ethylene glycol 50% solution (synthesized product)
5) Tetramethylammonium acetate 50%, ethylene glycol 50% solution (synthesized product)
6) Tetramethylammonium formate 50%, ethylene glycol 50% solution (synthesized product)
7) Methyltriethylammonium acetate 50%, ethylene glycol 50% solution (synthesized product)
8) Manufactured by TOSOH CORPORATION: N,N,N',N'-Tetramethylhexamethylenediamine (tradename: TOYOCAT-MR)
9) Manufactured by Nippon Nyukazai Co., Ltd.: 1-Isobutyl-2-methylimidazole
10) Manufactured by TOSOH CORPORATION: N,N',N''-Tris(3-dimethylaminopropyl)-hexahydro-s-triazine (tradename: TOYOCAT-TRC)
11) Manufactured by Dow: MDI base isocyanate prepolymer As is evident from Table 3, in a case where the catalyst system of the present invention was used (Examples 11 to 14), the cream time can be extended at least 2 seconds longer than a case where triethylenediamine as a conventional catalyst was used alone (Comparative Example 31), and at the same time, it is possible to obtain a polyurethane resin for shoe soles having good curability and flowability. Further, the physical properties of the obtained polyurethane resin are also good, and it is possible to prepare a polyurethane resin for shoe soles excellent in moldability and physical properties with good working efficiency. Further, in Examples 11 to 14 wherein the catalyst system of the present invention was used, the change in RT after the storage is small, and the starting material blend liquid after the storage is practically useful level.

Whereas, in Comparative Examples 32 and 33 wherein a catalyst system of the present invention was not used, the cream time can not be extended, it is not possible to mold a polyurethane resin for shoe soles with good working efficiency, and the flowability of the polyurethane resin is poor.

Further, in Comparative Examples 34 to 38 wherein a quaternary ammonium salt compound or N,N',N'''-tris(3-dimethylaminopropyl)-hexahydro-s-triazine, as a part of the catalyst composition of the present invention, was used alone, although the cream time can be extended, the curability of the obtainable resin is poor, and the hardness of the resin decreases substantially, whereby there is a problem such that removal of a mold tends to be difficult, and it is difficult to mold a polyurethane resin for shoe soles with good efficiency.

Comparative Examples 39 to 44 and Examples 15 to 20

In accordance with the blend formulation as identified in Table 4, a starting material blend liquid A was prepared, and at the same time, a polyisocyanate was prepared.

A polyurethane resin for shoe soles was prepared by carrying out the same operation as in Example 1 except for the catalyst blend, and the initial reactivity, resin hardness, resin physical properties and reactivity after the storage, were measured. These results are also shown in Table 4.

TABLE 4

| | | | | pKa of quaternary ammonium salt anion (organic acid group) | Comparative Example | | | | | |
|---|---|---|---|---|---|---|---|---|---|---|
| | | | | | 39 | 40 | 41 | 42 | 43 | 44 |
| Blend formulation (parts by weight) | Starting material blend liquid A | | Polyol 1) | | 86.8 | 86.8 | 86.8 | 86.8 | 86.8 | 86.8 |
| | | | Cross-linking agent 2) | | 12.2 | 12.2 | 12.2 | 12.2 | 12.2 | 12.2 |
| | | (A) | TEDA-L33E 3) | | 0.86 | 0.86 | 0.72 | 0.99 | 0.72 | 0.09 |
| | | (B) Quaternary ammonium salt compound | Catalyst A 4) | 4.8 | — | — | 0.18 | 0.01 | — | — |
| | | | Catalyst B 5) | 4.8 | — | — | — | — | 0.18 | 0.01 |
| | | | Catalyst C 6) | 3.8 | — | — | — | — | — | — |
| | | | Catalyst D 7) | 4.8 | — | — | — | — | — | — |
| | | Tertiary amine compound | Catalyst G 8) | 4.9 | 0.04 | — | — | — | — | — |
| | | | Catalyst H 9) | 4.9 | — | 0.04 | — | — | — | — |
| | | | TRC 10) | | — | — | — | — | — | — |
| Isocyanate prepolymer 11) | | | | | 100 | 100 | 100 | 100 | 100 | 100 |
| System storage stability | | | | | | | | | | |
| Initial reactivity: Rise time (sec) | | | | | 92 | 99 | 102 | 88 | 103 | 88 |
| Reactivity after storage: Rise time (sec) | | | | | 110 | 121 | 102 | 88 | 104 | 88 |
| Rise time change (%) | | | | | 19.6 | 22.2 | 0.0 | 0.0 | 1.0 | 0.0 |
| Reactivity | | | | | | | | | | |
| Cream time (sec) | | | | | 14.5 | 17.5 | 18.0 | 14.5 | 18.0 | 14.5 |
| Tack free time (sec) | | | | | 45 | 45 | 51 | 44 | 51 | 44 |

TABLE 4-continued

|  |  |  |  |  |  |  |  |  |
|---|---|---|---|---|---|---|---|---|
| Rise time (sec) |  |  |  | 92 | 99 | 102 | 88 | 103 | 88 |
| Physical properties of polyurethane resin |  |  |  |  |  |  |  |  |  |
| Flowability |  |  |  | 88 | 88 | 93 | 84 | 93 | 84 |
| Core density (kg/m³) |  |  |  | 500 | 500 | 500 | 500 | 500 | 500 |
| Hardness (Shore C) |  |  |  |  |  |  |  |  |  |
| After 2 min from demold |  |  |  | 38 | 38 | 33 | 39 | 35 | 39 |
| After 5 days from demold |  |  |  | 60 | 60 | 58 | 63 | 60 | 63 |
| Tensile strength (MPa) |  |  |  | 1.83 | 1.82 | 1.80 | 1.85 | 1.82 | 1.85 |
| Elongation (%) |  |  |  | 390 | 390 | 384 | 402 | 390 | 402 |
| 100% Modulus (MPa) |  |  |  | 0.61 | 0.60 | 0.56 | 0.62 | 0.58 | 0.62 |
| 300% Modulus (MPa) |  |  |  | 1.33 | 1.32 | 1.30 | 1.34 | 1.28 | 1.34 |

|  |  |  |  | Example |  |  |  |  |  |
|---|---|---|---|---|---|---|---|---|---|
|  |  |  |  | 15 | 16 | 17 | 18 | 19 | 20 |
| Blend formulation (parts by weight) | Starting material blend liquid A |  | Polyol 1) | 86.8 | 86.8 | 86.8 | 86.8 | 86.8 | 86.8 |
|  |  |  | Cross-linking agent 2) | 12.2 | 12.2 | 12.2 | 12.2 | 12.2 | 12.2 |
|  |  | (A) | TEDA-L33E 3) | 0.86 | 0.86 | 0.86 | 0.86 | 0.86 | 0.86 |
|  |  | (B) Quaternary ammonium salt compound | Catalyst A 4) 4.8 | 0.04 | — | — | — | 0.04 | — |
|  |  |  | Catalyst B 5) 4.8 | — | 0.04 | — | — | — | 0.04 |
|  |  |  | Catalyst C 6) 3.8 | — | — | 0.04 | — | — | — |
|  |  |  | Catalyst D 7) 4.8 | — | — | — | 0.04 | — | — |
|  |  | Tertiary amine compound | Catalyst E 8) 4.9 | — | — | — | — | — | — |
|  |  |  | Catalyst F 9) 4.9 | — | — | — | — | — | — |
|  |  |  | TRC 10) | — | — | — | — | 0.04 | 0.04 |
| Isocyanate prepolymer 11) |  |  |  | 100 | 100 | 100 | 100 | 100 | 100 |
| System storage stability |  |  |  |  |  |  |  |  |  |
| Initial reactivity: Rise time (sec) |  |  |  | 73 | 73 | 74 | 74 | 74 | 74 |
| Reactivity after storage: Rise time (sec) |  |  |  | 73 | 73 | 75 | 75 | 74 | 75 |
| Rise time change (%) |  |  |  | 0.0 | 0.0 | 1.4 | 1.4 | 0.0 | 1.4 |
| Reactivity |  |  |  |  |  |  |  |  |  |
| Cream time (sec) |  |  |  | 17.5 | 17.5 | 17.5 | 17.5 | 17.5 | 17.5 |
| Tack free time (sec) |  |  |  | 41 | 40 | 41 | 42 | 42 | 42 |
| Rise time (sec) |  |  |  | 73 | 73 | 74 | 74 | 74 | 74 |
| Physical properties of polyurethane resin |  |  |  |  |  |  |  |  |  |
| Flowability |  |  |  | 90 | 91 | 89 | 90 | 69 | 69 |
| Core density (kg/m³) |  |  |  | 500 | 500 | 500 | 500 | 500 | 500 |
| Hardness (Shore C) |  |  |  |  |  |  |  |  |  |
| After 2 min from demold |  |  |  | 42 | 42 | 41 | 42 | 37.0 | 36.0 |
| After 5 days from demold |  |  |  | 63 | 63 | 62 | 62 | 57.0 | 57.0 |
| Tensile strength (MPa) |  |  |  | 1.86 | 1.85 | 1.85 | 1.85 | 1.80 | 1.79 |
| Elongation (%) |  |  |  | 398 | 397 | 396 | 398 | 370 | 367 |
| 100% Modulus (MPa) |  |  |  | 0.62 | 0.63 | 0.63 | 0.62 | 0.57 | 0.58 |
| 300% Modulus (MPa) |  |  |  | 1.35 | 1.35 | 1.34 | 1.34 | 1.28 | 1.29 |

1) Manufactured by Dow: Adipate type polyester polyol (containing 0.4% of water)
2) Manufactured by Dow: Crosslinking agent GF302
3) Manufactured by TOSOH CORPORATION: Triethylenediamine 33%, ethylene glycol 67% (tradename: TEDA-L33E)
4) Tetraethylammonium acetate 50%, ethylene glycol 50% solution (synthesized product)
5) Tetramethylammonium acetate 50%, ethylene glycol 50% solution (synthesized product)
6) Tetramethylammonium formate 50%, ethylene glycol 50% solution (synthesized product)
7) Methyltriethylammonium acetate 50%, ethylene glycol 50% solution (synthesized product)
8) Methyltriethylammonium 2-ethylhexanoate (synthesized product)
9) N,N,N-Trimethyl-N-hydroxypropylammonium 2-ethylhexanoate 75%, diethylene glycol 25% (manufactured by Air Products and Chemicals: DABCO-TMR)
10) Manufactured by TOSOH CORPORATION: N,N',N''-Tris(3-dimethylaminopropyl)-hexahydro-s-triazine (tradename: TOYOCAT-TRC)
11) Manufactured by Dow: MDI base isocyanate prepolymer As is evident from Table 4, in Comparative Examples 39 to 40 wherein a quaternary ammonium salt compound outside the present invention was used, RT after the storage is consistently slow, and such is not suitable for storage and lacks in practical usefulness. Further, the hardness of the obtainable polyurethane resin is also low, and it is not possible to obtain a polyurethane resin for shoe soles having good physical properties with good productivity.

Further, in Comparative Examples 41 to 44 wherein although a catalyst system of the present invention was employed, the blend ratio of catalyst of the catalyst system was outside the definition by the present invention, there is a problem such that the curability of the polyurethane resin is low even though the cream time can be extended, or the cream time can not be extended, and such is not practically useful.

Whereas, in Examples 15 to 18 wherein although a part of the catalyst system of the present invention was employed, N,N',N"-tris(3-dimethylaminopropyl)-hexahydro-s-triazine was not used, it is possible to mold a polyurethane resin having good curability, while extending the cream time, but with respect to its flowability, an improvement is desired.

Further, in Examples 19 and 20 wherein a part of the catalyst system of the present invention was employed, and excess N,N',N"-tris(3-dimethylaminopropyl)-hexahydro-s-triazine was used, it is possible to accomplish extension of the cream time and improvement of the flowability, but the curability, hardness and physical properties of the obtainable polyurethane resin, are decreased.

Examples 21 to 26 and Comparative Examples 45 to 61

In accordance with the blend formulation as identified in Table 5, a starting material blend liquid A was prepared, and at the same time, a polyisocyanate was prepared.

A polyurethane resin for shoe soles was prepared by carrying out the same operation as in Example 1 except for the catalyst blend, and the initial reactivity, resin hardness, flowability, resin physical properties and reactivity after the storage were measured. These results are also shown in Table 5.

TABLE 5

|  |  |  |  | Example | | | | | |
|---|---|---|---|---|---|---|---|---|---|
|  |  |  |  | 21 | 22 | 23 | 24 | 25 | 26 |
| Blend formulation (parts by weight) | Starting material blend liquid A |  | Polyol 1) | 86.8 | 86.8 | 86.8 | 86.8 | 86.8 | 86.8 |
|  |  |  | Cross-linking agent 2) | 12.2 | 12.2 | 12.2 | 12.2 | 12.2 | 12.2 |
|  |  | (A) | TEDA-L33E 3) | 0.86 | 0.86 | 0.86 | 0.86 | 0.86 | 0.86 |
|  |  | (B) Alkali metal salt of carboxylic acid | Catalyst I 4) | 0.04 | — | — | — | — | — |
|  |  |  | Catalyst J 5) | — | 0.04 | — | — | — | — |
|  |  | (B) Polyisocyanulating catalyst | Catalyst N 6) | — | — | — | — | 0.04 | — |
|  |  |  | Catalyst O 7) | — | — | — | — | — | 0.04 |
|  |  | (C) Highly temperature sensitive catalyst | Catalyst K 8) | — | — | 0.04 | — | — | — |
|  |  |  | Catalyst L 9) | — | — | — | 0.04 | — | — |
|  |  | Highly temperature sensitive catalyst | Catalyst M 10) | — | — | — | — | — | — |
|  |  |  | TRC 11) | 0.01 | 0.01 | 0.01 | 0.01 | 0.01 | 0.01 |
| System storage stability |  |  |  | 100 | 100 | 100 | 100 | 100 | 100 |
| Initial reactivity: Rise time (sec) |  |  |  | 64 | 69 | 82 | 88 | 85 | 88 |
| Reactivity after storage: Rise time (sec) |  |  |  | 64 | 70 | 82 | 88 | 85 | 88 |
| Rise time change (%) |  |  |  | 0.0 | 1.4 | 0.0 | 0.0 | 0.0 | 0.0 |
| Reactivity |  |  |  |  |  |  |  |  |  |
| Cream time (sec) |  |  |  | 17.5 | 17.5 | 17.0 | 17.0 | 16.5 | 16.5 |
| Tack free time (sec) |  |  |  | 44 | 44 | 40 | 42 | 43 | 44 |
| Rise time (sec) |  |  |  | 64 | 69 | 82 | 88 | 85 | 88 |
| Physical properties of polyurethane resin |  |  |  |  |  |  |  |  |  |
| Flowability |  |  |  | 89.0 | 90.0 | 89.0 | 88.0 | 85.0 | 84.0 |
| Core density (kg/m$^3$) |  |  |  | 500 | 500 | 500 | 500 | 500 | 500 |
| Hardness (Shore C) |  |  |  |  |  |  |  |  |  |
| After 2 min from demold |  |  |  | 39 | 39 | 39 | 39 | 39 | 39 |
| After 5 days from demold |  |  |  | 61 | 60 | 64 | 64 | 62 | 62 |
| Tensile strength (MPa) |  |  |  | 1.86 | 1.85 | 1.85 | 1.85 | 1.85 | 1.84 |
| Elongation (%) |  |  |  | 395 | 395 | 390 | 390 | 400 | 395 |
| 100% Modulus (MPa) |  |  |  | 0.62 | 0.63 | 0.63 | 0.62 | 0.62 | 0.62 |
| 300% Modulus (MPa) |  |  |  | 1.35 | 1.35 | 1.34 | 1.34 | 1.34 | 1.34 |

TABLE 5-continued

| | | | | Comparative Example | | | | | | | | |
|---|---|---|---|---|---|---|---|---|---|---|---|---|
| | | | | 45 | 46 | 47 | 48 | 49 | 50 | 51 | 52 | 53 |
| Blend formulation (parts by weight) | Starting material blend liquid A | | Polyol 1) | 86.8 | 86.8 | 86.8 | 86.8 | 86.8 | 86.8 | 86.8 | 86.8 | 86.8 |
| | | | Cross-linking agent 2) | 12.2 | 12.2 | 12.2 | 12.2 | 12.2 | 12.2 | 12.2 | 12.2 | 12.2 |
| | | (A) | TEDA-L33E 3) | — | — | — | — | — | 0.72 | 0.99 | 0.72 | 0.99 |
| | | (B) Alkali metal salt of carboxylic acid | Catalyst I 4) | 1.00 | — | — | — | — | 0.18 | 0.01 | — | — |
| | | | Catalyst J 5) | — | 1.00 | — | — | — | — | — | 0.18 | 0.01 |
| | | (B) Polyiso-cyanulating catalyst | Catalyst N 6) | — | — | — | 1.00 | — | — | — | — | — |
| | | | Catalyst O 7) | — | — | — | — | 1.00 | — | — | — | — |
| | | (C) Highly temperature sensitive catalyst | Catalyst K 8) | — | — | — | — | — | — | — | — | — |
| | | | Catalyst L 9) | — | — | — | — | — | — | — | — | — |
| | | Highly temperature sensitive catalyst | Catalyst M 10) | — | — | 1.00 | — | — | — | — | — | — |
| | | | TRC 11) | — | — | — | — | — | — | — | — | — |
| System storage stability | | | | 100 | 100 | 100 | 100 | 100 | 100 | 100 | 100 | 100 |
| Initial reactivity: Rise time (sec) | | | | 109 | 106 | 109 | 109 | 112 | 101 | 93 | 106 | 94 |
| Reactivity after storage: Rise time (sec) | | | | 112 | 115 | 135 | 109 | 115 | 102 | 95 | 107 | 94 |
| Rise time change (%) | | | | 2.8 | 8.5 | 23.9 | 0.0 | 2.7 | 1.0 | 2.2 | 0.9 | 0.0 |
| Reactivity | | | | | | | | | | | | |
| Cream time (sec) | | | | 18.5 | 18.5 | 19.0 | 18.0 | 18.0 | 17.5 | 14.5 | 17.5 | 14.5 |
| Tack free time (sec) | | | | 50 | 53 | 52 | 51 | 53 | 49 | 44 | 50 | 43 |
| Rise time (sec) | | | | 109 | 106 | 109 | 109 | 112 | 101 | 93 | 106 | 94 |
| Physical properties of polyurethane resin | | | | | | | | | | | | |
| Flowability | | | | 101.0 | 100.0 | 105.0 | 99.0 | 98.0 | 92.0 | 90.0 | 93.0 | 90.0 |
| Core density (kg/m$^3$) | | | | 500 | 500 | 500 | 500 | 500 | 500 | 500 | 500 | 500 |
| Hardness (Shore C) | | | | | | | | | | | | |
| After 2 min from demold | | | | 30 | 31 | 32 | 30 | 28 | 35 | 39 | 34 | 38 |
| After 5 days from demold | | | | 51 | 51 | 52 | 51 | 52 | 60 | 61 | 59 | 62 |
| Tensile strength (MPa) | | | | 1.64 | 1.62 | 1.58 | 1.57 | 1.55 | 1.80 | 1.85 | 1.83 | 1.84 |
| Elongation (%) | | | | 320 | 301 | 295 | 320 | 305 | 380 | 400 | 375 | 400 |
| 100% Modulus (MPa) | | | | 0.52 | 0.50 | 0.51 | 0.50 | 0.49 | 0.59 | 0.62 | 0.59 | 0.61 |
| 300% Modulus (MPa) | | | | 1.12 | 1.10 | 1.10 | 1.12 | 1.08 | 1.30 | 1.34 | 1.30 | 1.33 |

| | | | | Comparative Example | | | | | | | |
|---|---|---|---|---|---|---|---|---|---|---|---|
| | | | | 54 | 55 | 56 | 57 | 58 | 59 | 60 | 61 |
| Blend formulation (parts by weight) | Starting material blend liquid A | | Polyol 1) | 86.8 | 86.8 | 86.8 | 86.8 | 86.8 | 86.8 | 86.8 | 86.8 |
| | | | Cross-linking agent 2) | 12.2 | 12.2 | 12.2 | 12.2 | 12.2 | 12.2 | 12.2 | 12.2 |
| | | (A) | TEDA-L33E 3) | 0.72 | 0.99 | 0.72 | 0.99 | 0.72 | 0.99 | 0.72 | 0.99 |
| | | (B) Alkali metal salt of carboxylic acid | Catalyst I 4) | — | — | — | — | — | — | — | — |
| | | | Catalyst J 5) | — | — | — | — | — | — | — | — |
| | | (B) Polyiso-cyanulating catalyst | Catalyst N 6) | — | — | — | — | 0.18 | 0.01 | — | — |
| | | | Catalyst O 7) | — | — | — | — | — | — | 0.18 | 0.01 |
| | | (C) Highly temperature sensitive catalyst | Catalyst K 8) | 0.18 | 0.01 | — | — | — | — | — | — |
| | | | Catalyst L 9) | — | — | 0.18 | 0.01 | — | — | — | — |
| | | Highly temperature sensitive catalyst | Catalyst M 10) | — | — | — | — | — | — | — | — |
| | | | TRC 11) | — | — | — | — | — | — | — | — |
| System storage stability | | | | 100 | 100 | 100 | 100 | 100 | 100 | 100 | 100 |
| Initial reactivity: Rise time (sec) | | | | 102 | 94 | 103 | 93 | 103 | 93 | 103 | 93 |
| Reactivity after storage: Rise time (sec) | | | | 102 | 95 | 104 | 93 | 103 | 93 | 103 | 93 |
| Rise time change (%) | | | | 0.0 | 1.1 | 1.0 | 0.0 | 0.0 | 0.0 | 0.0 | 0.0 |

TABLE 5-continued

| Reactivity | | | | | | | | |
|---|---|---|---|---|---|---|---|---|
| Cream time (sec) | 18.0 | 14.5 | 18.0 | 14.5 | 18.0 | 14.5 | 18.0 | 14.5 |
| Tack free time (sec) | 52 | 44 | 53 | 44 | 53 | 44 | 53 | 44 |
| Rise time (sec) | 102 | 94 | 103 | 93 | 103 | 93 | 103 | 93 |
| Physical properties of polyurethane resin | | | | | | | | |
| Flowability | 92.0 | 89.0 | 93.0 | 90.0 | 91.0 | 88.0 | 92.0 | 89.0 |
| Core density (kg/m$^3$) | 500 | 500 | 500 | 500 | 500 | 500 | 500 | 500 |
| Hardness (Shore C) | | | | | | | | |
| After 2 min from demold | 32 | 39 | 31 | 39 | 31 | 39 | 31 | 39 |
| After 5 days from demold | 57 | 63 | 56 | 63 | 56 | 63 | 56 | 63 |
| Tensile strength (MPa) | 1.80 | 1.85 | 1.80 | 1.85 | 1.80 | 1.85 | 1.80 | 1.85 |
| Elongation (%) | 384 | 397 | 380 | 400 | 380 | 400 | 380 | 400 |
| 100% Modulus (MPa) | 0.56 | 0.62 | 0.55 | 0.62 | 0.56 | 0.62 | 0.54 | 0.62 |
| 300% Modulus (MPa) | 1.29 | 1.34 | 1.28 | 1.34 | 1.27 | 1.34 | 1.29 | 1.34 |

1) Manufactured by Dow: Adipate type polyester polyol (containing 0.4% of water)
2) Manufactured by Dow: Crosslinking agent GF302
3) Manufactured by TOSOH CORPORATION: Triethylenediamine 33%, ethylene glycol 67% (tradename: TEDA-L33)
4) Potassium 2-ethylhexanoate 75%, diethylene glycol 25% (synthesized product)
5) Potassium acetate 38%, diethylene glycol 62% (synthesized product)
6) Manufactured by TOSOH CORPORATION: N,N,N'-Trimethylaminoethylethanolamine (tradename: TOYOCAT-RX5)
7) 2,4,6-Tris(dimethylaminomethyl)phenol (manufactured by Tokyo Kasei)
8) 1,8-Diazabicyclo[5.4.0]undecene-7 (manufactured by Tokyo Kasei) 68.8%, 1,2,4-Triazole (manufactured by Otsuka Kagaku) 31.2%
9) 1,8-Diazabicyclo[5.4.0]undecene-7 (manufactured by Tokyo Kasei) 56.1%, 1,2,4-Benzotriazole (manufactured by Tokyo Kasei) 43.9%
10) 1,8-Diazabicyclo[5.4.0]undecene-7 (manufactured by Tokyo Kasei)
11) Manufactured by TOSOH CORPORATION: N,N',N''-Tris(3-dimethylaminopropyl)-hexahydro-s-triazine (tradename: TOYOCAT-TRC)
12) Manufactured by Dow: MDI base isocyanate prepolymer As is evident from Table 5, in Examples 21 to 26 wherein the catalyst system of the present invention was used as the catalyst, the cream time can be taken at least 2 seconds longer than in Comparative Example 31 wherein triethylenediamine as a conventional catalyst was used alone, and it is possible to mold a polyurethane resin for shoe soles excellent in moldability. Further, the hardness and physical properties of the obtained polyurethane resin are sufficiently within a suitable range, and the flowability of the polyurethane resin is also substantially improved. Further, in Examples 21 to 26 wherein the catalyst system of the present invention was used, the change in RT after the storage is small, and the starting material blend liquid after the storage is practically useful level.

Whereas, in Comparative Examples 45 to 49 wherein an alkali metal salt of carboxylic acid, or N,N,N'-trimethylaminoethylethanolamine, 2,4,6-tri(dimethylaminomethyl)phenol or 1,8-diazabicyclo[5.4.0]undecene-7, as a part of the catalyst composition of the present invention, was used alone, although the cream time can be extended, the curability of the obtainable polyurethane resin tends to be poor, and the hardness of the resin decreases substantially, whereby there is a problem such that removal of a mold tends to be difficult, and it is difficult to mold a polyurethane resin for shoe soles with good efficiency.

Further, in Comparative Example 47 wherein 1,8-diazabicyclo[5.4.0]undecene-7 not blocked with a blocking agent, was used, the storage stability of the system was substantially deteriorated, and there is a problem of deterioration of the catalyst.

Further, in Comparative Examples 50 to 61 wherein a part of the catalyst system of the present invention was employed, but the blend ratio of the catalyst in the catalyst system was outside the definition by the present invention, there is a problem such that although the cream time can be extended, the curability of the polyurethane resin is low, and such is not practically useful, or there is a problem such that the cream time can not be extended. Thus, it is evident that such is not a suitable catalyst system.

Examples 27 to 38

In accordance with the blend formulation as identified in Table 6, a starting material blend liquid A was prepared, and at the same time, a polyisocyanate was prepared.

A polyurethane resin for shoe soles was prepared by carrying out the same operation as in Example 1 except for the catalyst blend, and the initial reactivity, resin hardness, flowability, resin physical properties and reactivity after the storage were measured. These results are also shown in Table 6.

TABLE 6

| | | | | Example | | | | | |
|---|---|---|---|---|---|---|---|---|---|
| | | | | 27 | 28 | 29 | 30 | 31 | 32 |
| Blend formulation (parts by weight) | Starting material blend liquid A | | Polyol 1) | 86.8 | 86.8 | 86.8 | 86.8 | 86.8 | 86.8 |
| | | | Cross-linking agent 2) | 12.2 | 12.2 | 12.2 | 12.2 | 12.2 | 12.2 |
| | | (A) | TEDA-L33E 3) | 0.85 | 0.85 | 0.85 | 0.85 | 0.85 | 0.85 |
| | | (B) Alkali metal salt of carboxylic acid | Catalyst I 4) | 0.04 | — | — | — | — | — |
| | | | Catalyst J 5) | — | 0.04 | — | — | — | — |
| | | (B) Polyisocyanulating catalyst | Catalyst N 6) | — | — | — | — | 0.04 | — |
| | | | Catalyst O 7) | — | — | — | — | — | 0.04 |

TABLE 6-continued

|  |  |  |  |  |  |  |  |  |
|---|---|---|---|---|---|---|---|---|
|  | (C) Highly temperature sensitive catalyst | Catalyst K 8) | — | — | 0.04 | — | — | — |
|  |  | Catalyst L 9) | — | — | — | 0.04 | — | — |
|  |  | TRC 10) | — | — | — | — | — | — |
|  | Isocyanate prepolymer 11) |  | 100 | 100 | 100 | 100 | 100 | 100 |
| System storage stability |  |  |  |  |  |  |  |  |
| Initial reactivity: Rise time (sec) |  |  | 64 | 69 | 82 | 88 | 85 | 88 |
| Reactivity after storage: Rise time (sec) |  |  | 64 | 70 | 82 | 88 | 85 | 88 |
| Rise time change (%) |  |  | 0.0 | 1.4 | 0.0 | 0.0 | 0.0 | 0.0 |
| Reactivity |  |  |  |  |  |  |  |  |
| Cream time (sec) |  |  | 17.5 | 17.5 | 17.0 | 17.0 | 16.5 | 16.5 |
| Tack free time (sec) |  |  | 44 | 44 | 40 | 42 | 43 | 44 |
| Rise time (sec) |  |  | 64 | 69 | 82 | 88 | 85 | 88 |
| Physical properties of polyurethane resin |  |  |  |  |  |  |  |  |
| Flowability |  |  | 95.0 | 94.0 | 93.0 | 92.0 | 91.0 | 90.0 |
| Core density (kg/m$^3$) |  |  | 500 | 500 | 500 | 500 | 500 | 500 |
| Hardness (Shore C) |  |  |  |  |  |  |  |  |
| After 2 min from demold |  |  | 39 | 39 | 39 | 39 | 39 | 39 |
| After 5 days from demold |  |  | 61 | 60 | 64 | 64 | 62 | 62 |
| Tensile strength (MPa) |  |  | 1.85 | 1.85 | 1.85 | 1.85 | 1.85 | 1.84 |
| Elongation (%) |  |  | 395 | 395 | 390 | 390 | 400 | 395 |
| 100% Modulus (MPa) |  |  | 0.62 | 0.63 | 0.63 | 0.62 | 0.62 | 0.62 |
| 300% Modulus (MPa) |  |  | 1.35 | 1.35 | 1.34 | 1.34 | 1.34 | 1.34 |

|  |  |  | Example |  |  |  |  |  |
|---|---|---|---|---|---|---|---|---|
|  |  |  | 33 | 34 | 35 | 36 | 37 | 38 |
| Blend formulation (parts by weight) | Starting material blend liquid A | Polyol 1) | 86.8 | 86.8 | 86.8 | 86.8 | 86.8 | 86.8 |
|  |  | Cross-linking agent 2) | 12.2 | 12.2 | 12.2 | 12.2 | 12.2 | 12.2 |
|  | (A) | TEDA-L33E 3) | 0.80 | 0.80 | 0.80 | 0.80 | 0.80 | 0.80 |
|  | (B) Alkali metal salt of carboxylic acid | Catalyst I 4) | — | — | — | — | 0.04 | — |
|  |  | Catalyst J 5) | — | — | — | — | — | 0.04 |
|  | (B) Polyiso-cyanulating catalyst | Catalyst N 6) | — | — | 0.04 | — | — | — |
|  |  | Catalyst O 7) | — | — | — | 0.04 | — | — |
|  | (C) Highly temperature sensitive catalyst | Catalyst K 8) | 0.04 | — | — | — | — | — |
|  |  | Catalyst L 9) | — | 0.04 | — | — | — | — |
|  |  | TRC 10) | 0.04 | 0.04 | 0.04 | 0.04 | 0.04 | 0.04 |
|  | Isocyanate prepolymer 11) |  | 100 | 100 | 100 | 100 | 100 | 100 |
| System storage stability |  |  |  |  |  |  |  |  |
| Initial reactivity: Rise time (sec) |  |  | 89 | 88 | 91 | 90 | 91 | 91 |
| Reactivity after storage: Rise time (sec) |  |  | 89 | 89 | 91 | 91 | 91 | 92 |
| Rise time change (%) |  |  | 0.0 | 1.1 | 0.0 | 1.1 | 0.0 | 1.1 |
| Reactivity |  |  |  |  |  |  |  |  |
| Cream time (sec) |  |  | 17.0 | 17.0 | 17.0 | 17.0 | 17.0 | 17.0 |
| Tack free time (sec) |  |  | 49 | 50 | 51 | 50 | 51 | 51 |
| Rise time (sec) |  |  | 89 | 88 | 91 | 90 | 91 | 91 |
| Physical properties of polyurethane resin |  |  |  |  |  |  |  |  |
| Flowability |  |  | 76.0 | 76.0 | 73.0 | 74.0 | 75.0 | 76.0 |
| Core density (kg/m$^3$) |  |  | 500 | 500 | 500 | 500 | 500 | 500 |
| Hardness (Shore C) |  |  |  |  |  |  |  |  |
| After 2 min from demold |  |  | 34 | 33 | 34 | 34 | 33 | 32 |
| After 5 days from demold |  |  | 57 | 55 | 56 | 56 | 57 | 56 |
| Tensile strength (MPa) |  |  | 1.80 | 1.79 | 1.80 | 1.81 | 1.82 | 1.78 |
| Elongation (%) |  |  | 370 | 368 | 365 | 370 | 371 | 370 |

TABLE 6-continued

| | | | | | | |
|---|---|---|---|---|---|---|
| 100% Modulus (MPa) | 0.58 | 0.57 | 0.57 | 0.56 | 0.55 | 0.57 |
| 300% Modulus (MPa) | 1.30 | 1.29 | 1.28 | 1.27 | 1.28 | 1.28 |

1) Manufactured by Dow: Adipate type polyester polyol (containing 0.4% of water)
2) Manufactured by Dow: Crosslinking agent GF302
3) Manufactured by TOSOH CORPORATION: Triethylenediamine 33%, ethylene glycol 67% (tradename: TEDA-L33)
4) Potassium 2-ethylhexanoate 75%, diethylene glycol 25% (synthesized product)
5) Potassium acetate 38%, diethylene glycol 62% (synthesized product)
6) Manufactured by TOSOH CORPORATION: N,N,N'-Trimethylaminoethylethanolamine (tradename: TOYOCAT-RX5)
7) 2,4,6-Tris(dimethylaminomethyl)phenol (manufactured by Tokyo Kasei)
8) 1,8-Diazabicyclo[5.4.0]undecene-7 (manufactured by Tokyo Kasei) 68.8%, 1,2,4-Triazole (manufactured by Otsuka Kagaku) 31.2%
9) 1,8-Diazabicyclo[5.4.0]undecene-7 (manufactured by Tokyo Kasei) 56.1%, 1,2,4-Benzotriazole (manufactured by Tokyo Kasei) 43.9%
10) Manufactured by TOSOH CORPORATION: N,N',N''-Tris(3-dimethylaminopropyl)-hexahydro-s-triazine (tradename: TOYOCAT-TRC)
11) Manufactured by Dow: MDI base isocyanate prepolymer As is evident from Table 6, in Examples 27 to 32 wherein although a part of the catalyst system of the present invention was employed, N,N'—N''-tris(3-dimethylaminopropyl)-hexahydro-s-triazine was not used, it is possible to mold a polyurethane resin having good curability while extending the cream time, but with respect to its flowability, an improvement is desired.

Further, in Examples 33 to 38 wherein although a part of the catalyst system of the present invention was employed, excess N,N',N''-tris(3-dimethylaminopropyl)-hexahydro-s-triazine was used, although it is possible to accomplish extension of the cream time and improvement of the flowability, the curability, hardness and physical properties of the obtainable polyurethane resin are decreased.

Examples 39 to 42 and Comparative Example 62 to 65

In accordance with the blend formulation using a polyether polyol as identified in Table 7, a starting material blend liquid A was prepared. An isocyanate prepolymer was obtained by reacting pure MDI with polypropylene glycol (molecular weight: 2,000).

The weight ratio of the starting material blend liquid A to the isocyanate prepolymer was determined to obtain a predetermined isocyanate index (100), and both were adjusted to a liquid temperature of 25° C. The predetermined amounts of these two liquids were put into a 200 ml cup and stirred at 3,000 rpm for 8 seconds by means of a laboratory mixer and poured into a 300 ml cup and an aluminum mold, and the reactivity, resin hardness and flowability were measured in the same manner as in Example 1.

The results are shown in Table 7.

TABLE 7

| | | | | Example | | | |
|---|---|---|---|---|---|---|---|
| | | | | 39 | 40 | 41 | 42 |
| Blend formulation (parts by weight) | Starting material blend liquid A | | Polyol A 1) | 33.0 | 33.0 | 33.0 | 33.0 |
| | | | Polyol B 2) | 52.0 | 52.0 | 52.0 | 52.0 |
| | | | Crosslinking agent 3) | 15.0 | 15.0 | 15.0 | 15.0 |
| | | | Foam stabilizer 4) | 0.8 | 0.8 | 0.8 | 0.8 |
| | | | Water | 0.3 | 0.3 | 0.3 | 0.3 |
| | | (A) | TEDA-L33B 5) | 1.25 | 0.83 | 1.29 | 0.86 |
| | | (C) Highly temperature sensitive catalyst | Catalyst K 6) | 0.20 | 0.20 | 0.14 | 0.14 |
| | | Tertiary amine catalyst | Catalyst P 7) | 1.25 | 1.67 | 1.29 | 1.72 |
| | | Metal-type catalyst | Catalyst Q 8) | — | — | — | — |
| | Isocyanate prepolymer 10) | | | 109 | 109 | 109 | 109 |
| Reactivity | | | | | | | |
| Cream time (sec) | | | | 9.0 | 9.0 | 9.0 | 9.0 |
| Tack free time (sec) | | | | 21 | 22 | 21 | 20 |
| Rise time (sec) | | | | 41 | 42 | 42 | 41 |
| Physical properties of polyurethane resin | | | | | | | |
| Flowability | | | | 101 | 102 | 102 | 102 |
| Core density (kg/m$^3$) | | | | 500 | 500 | 500 | 500 |
| Hardness (Shore C) | | | | | | | |
| After 2 min from demold | | | | 46 | 48 | 46 | 48 |
| After 5 days from demold | | | | 60 | 61 | 60 | 60 |

TABLE 7-continued

|  |  |  |  | Compartive Example | | | |
|---|---|---|---|---|---|---|---|
|  |  |  |  | 62 | 63 | 64 | 65 |
| Blend formulation (parts by weight) | Starting material blend liquid A |  | Polyol A 1) | 33.0 | 33.0 | 33.0 | 33.0 |
|  |  |  | Polyol B 2) | 52.0 | 52.0 | 52.0 | 52.0 |
|  |  |  | Crosslinking agent 3) | 15.0 | 15.0 | 15.0 | 15.0 |
|  |  |  | Foam stabilizer 4) | 0.8 | 0.8 | 0.8 | 0.8 |
|  |  |  | Water | 0.3 | 0.3 | 0.3 | 0.3 |
|  |  | (A) | TEDA-L33B 5) | 2.60 | 0.50 | — | 1.29 |
|  |  | (C) Highly temperature sensitive catalyst | Catalyst K 6) | — | — | — | — |
|  |  | Tertiary amine catalyst | Catalyst P 7) | — | — | 2.55 | 1.29 |
|  |  | Metal-type catalyst | Catalyst Q 8) | — | 0.12 | — | — |
|  | Isocyanate prepolymer 10) |  |  | 109 | 109 | 109 | 109 |
| Reactivity |  |  |  |  |  |  |  |
| Cream time (sec) |  |  |  | 7.0 | 9.0 | 7.0 | 7.0 |
| Tack free time (sec) |  |  |  | 21 | 20 | 20 | 20 |
| Rise time (sec) |  |  |  | 41 | 38 | 39 | 39 |
| Physical properties of polyurethane resin |  |  |  |  |  |  |  |
| Flowability |  |  |  | 100 | 106 | 101 | 100 |
| Core density (kg/m³) |  |  |  | 500 | 500 | 500 | 500 |
| Hardness (Shore C) |  |  |  |  |  |  |  |
| After 2 min from demold |  |  |  | 39 | 48 | 49 | 48 |
| After 5 days from demold |  |  |  | 56 | 61 | 60 | 60 |

1) Polyol having an average molecular weight of 5,000 obtained by reacting glycerol with propylene oxide and finally capping ethylene oxide.
2) Polyol having an average molecular weight of 3,000 obtained by reacting glycerol with propylene oxide and finally capping ethylene oxide.
3) 1,4-Butanediol (reagent)
4) Manufactured by Dow Corning Toray: Silicon foam stabilizer, SRX274C
5) Manufactured by TOSOH CORPORATION: Triethylenediamine 33%, 1,4-butanediol 67% (tradename: TEDA-L33B)
6) 1,8-Diazabicyclo[5.4.0]undecene-7 (manufactured by Tokyo Kasei) 68.8%, 1,2,4-Triazole (manufactured by Otsuka Kagaku) 31.2%
7) Manufactured by TOSOH CORPORATION: 1,2-Dimethylimidazole (tradename: TOYOCAT-DM70)
8) Dibutyltin dilaurate (reagent)
9) Polypropylene glycol (molecular weight 2,000, reagent) was reacted with 4,4'-diphenylmethane diisocyanate (MILLIONATE HTL manufactured by Nippon Polyurethane). The NCO concentration was 18.0%.

As is evident from Table 7, in Examples 39 to 42 wherein the catalyst composition of the present invention and the imidazole catalyst were used in combination, it is possible to extend the cream time at least 2 seconds longer than in Comparative Example 62 wherein triethylenediamine as a conventional catalyst was used, and at the same time, good curability is obtainable. Accordingly, it is possible to produce a polyurethane resin for shoe soles excellent in moldability, with good productivity.

Whereas, in Comparative Example 63 wherein an organic tin catalyst was used in combination, the flowability deteriorates although the cream time can be extended for 2 seconds. Further, there is a toxicity problem due to the use of the organic tin. In Comparative Example 64 wherein an imidazole type catalyst was used alone, or in Comparative Example 65 wherein triethylenediamine and an imidazole type catalyst were used in combination, the cream time is quick, and therefore, there is a problem in the moldability.

INDUSTRIAL APPLICABILITY

When the catalyst composition of the present invention is used, it is possible to produce a polyurethane resin excellent in curability, moldability and flowability safely with good productivity without impairing the physical properties of the polyurethane resin or the storage stability of the starting material blend liquid, while the initial reactivity is suppressed, such being industrially very useful.

Further, the polyurethane resin obtained by the present invention is suitable for application to shoe soles and is industrially very useful.

The entire disclosure of Japanese Patent Application No. 2006-220376 filed on Aug. 11, 2006 including specification, claims and summary is incorporated herein by reference in its entirety.

The invention claimed is:

1. A catalyst composition for production of a polyurethane resin, which comprises (A) triethylenediamine and (B) a polyisocyanurating catalyst, wherein:
the polyisocyanurating catalyst (B) is one or more compounds selected from the group consisting of a quaternary ammonium salt compound of the following formula (1):

(1)

wherein each of $R_1$ to $R_3$ is a $C_{1-3}$ alkyl group, $R_4$ is a $C_{1-5}$ saturated alkyl group, and X is an organic acid group having an acid dissociation constant (pKa) of at most 4.8; and
the blend ratio of the polyisocyanurating catalyst (B) and the triethylenediamine (A) is from 2 wt % to 20 wt %.

2. The catalyst composition for production of a polyurethane resin according to claim 1, wherein in the polyisocyanurating catalyst (B) is a quaternary ammonium salt compound of the formula (1), where X is a formic acid group or an acetic acid group.

3. The catalyst composition for production of a polyurethane resin according to claim 1, which further contains one or more solvents selected from the group consisting of water, ethylene glycol, propylene glycol, dipropylene glycol, 1,4-butanediol and 1,6-hexanediol.

4. The catalyst composition for production of a polyurethane resin according to claim 1, which further contains one or more catalysts selected from the group consisting of N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, bis(2-dimethylaminoethyl)ether bisdimethylaminodiethyl ether and N,N',N''-tris(3-dimethylaminopropyl)-hexahydro-s-triazine.

5. A method for producing a polyurethane resin, which comprises reacting a polyol with a polyisocyanate and/or an isocyanate prepolymer in the presence of a catalyst and a blowing agent to produce a polyurethane resin, wherein the catalyst composition as defined in claim 1 is used.

6. The method for producing a polyurethane resin according to claim 5, wherein the catalyst composition is present in an amount of from 0.01 to 5 parts by weight per 100 parts by weight of the polyol.

7. A catalyst composition for production of a polyurethane resin, which consists of (A) triethylenediamine and (B) a polyisocyanurating catalyst, wherein:
the polyisocyanurating catalyst (B) is one or more compounds selected from the group consisting of a quaternary ammonium salt compound of the following formula (1):

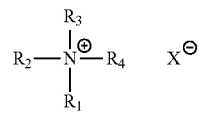

(1)

wherein each of $R_1$ to $R_3$ is a $C_{1-4}$ saturated alkyl group, provided that any two among $R_1$ to $R_3$ may form a hetero ring via an oxygen atom or a nitrogen atom, $R_4$ is a $C_{1-3}$ saturated alkyl group, and X is an organic acid group having an acid dissociation constant (pKa) of at most 4.8; and the blend ratio of the polyisocyanurating catalyst (B) to the triethylenediamine (A) is from 2 wt % to 20 wt %.

8. The catalyst composition for production of a polyurethane resin according to claim 7, wherein in the polyisocyanurating catalyst (B) is a quaternary ammonium salt compound of the formula (1), where X is a formic acid group or an acetic acid group.

9. A catalyst composition for production of a polyurethane resin, which consists of (A) triethylenediamine and (B) a polyisocyanurating catalyst and one or more solvents,
the polyisocyanurating catalyst (B) is one or more compounds selected from the group consisting of a quaternary ammonium salt compound of the following formula (1):

(1)

wherein each of $R_1$ to $R_3$ is a $C_{1-3}$ alkyl group, $R_4$ is a $C_{1-3}$ saturated alkyl group, and X is an organic acid group having an acid dissociation constant (pKa) of at most 4.8; and the blend ratio of the polyisocyanurating catalyst (B) and/or the highly temperature sensitive catalyst (C) to the triethylenediamine (A) is from 2 wt % to 20 wt %, and the solvents are selected from the group consisting of water, ethylene glycol, propylene glycol, dipropylene glycol, 1,4-butanediol and 1,6-hexanediol.

* * * * *